(12) United States Patent
Seguchi

(10) Patent No.: US 7,880,424 B2
(45) Date of Patent: Feb. 1, 2011

(54) ROTARY ELECTRIC APPARATUS HAVING ROTOR WITH FIELD WINDING INDUCING CURRENT THERETHROUGH FOR GENERATING MAGNETIC FIELD

(75) Inventor: Masahiro Seguchi, Oobu (JP)

(73) Assignee: Denso Corporation, Kariya (JP)

( * ) Notice: Subject to any disclaimer, the term of this patent is extended or adjusted under 35 U.S.C. 154(b) by 746 days.

(21) Appl. No.: 11/905,162

(22) Filed: Sep. 27, 2007

(65) Prior Publication Data

US 2008/0079375 A1    Apr. 3, 2008

(30) Foreign Application Priority Data

| Sep. 28, 2006 | (JP) | ................. 2006-265418 |
| Oct. 27, 2006 | (JP) | ................. 2006-292548 |
| Jan. 18, 2007 | (JP) | ................. 2007-009105 |

(51) Int. Cl.
*H02P 6/10* (2006.01)
*H02P 7/298* (2006.01)
*H02P 27/08* (2006.01)

(52) U.S. Cl. .................. 318/712; 318/700; 318/719; 318/720; 318/523

(58) Field of Classification Search ........... 318/521, 318/523, 528, 700, 712, 714, 716, 719–724; 310/180–184, 134–144
See application file for complete search history.

(56) References Cited

U.S. PATENT DOCUMENTS

| 4,240,020 A | * | 12/1980 | Okuyama et al. ........... 318/721 |
| 4,450,396 A | * | 5/1984 | Thornton .................... 318/721 |
| 4,670,696 A | * | 6/1987 | Byrne et al. ................. 318/701 |
| 4,743,825 A | * | 5/1988 | Nashiki ...................... 318/723 |
| 5,668,458 A | * | 9/1997 | Ueda et al. .................. 318/716 |
| 5,811,905 A | * | 9/1998 | Tang .......................... 310/179 |
| 5,929,590 A | * | 7/1999 | Tang .......................... 318/701 |
| 6,713,888 B2 | * | 3/2004 | Kajiura ...................... 290/40 F |
| 7,358,698 B2 | * | 4/2008 | Seguchi et al. ............. 318/700 |
| 2005/0212476 A1 | * | 9/2005 | Satake et al. ............... 318/720 |
| 2006/0197396 A1 | * | 9/2006 | Pollock et al. .............. 310/166 |
| 2006/0290316 A1 | | 12/2006 | Seguchi et al. |
| 2009/0072777 A1 | * | 3/2009 | Seguchi ...................... 318/718 |

FOREIGN PATENT DOCUMENTS

JP        58063057 A  *  4/1983

(Continued)

*Primary Examiner*—Walter Benson
*Assistant Examiner*—Eduardo Colon
(74) *Attorney, Agent, or Firm*—Nixon & Vanderhye PC

(57) ABSTRACT

A rotary electric apparatus comprise a synchronous machine of field winding type, an inverter, a DC power supply, a current flow regulator, and a controller. The DC power supply outputs first voltage of a first voltage value and second voltage of a second voltage value higher than the first voltage value. The current flow regulator regulates directions of currents flowing through a field winding by rotor exciting currents into one way, the current flow regulator being electrically connected to the field winding. The controller controls the inverter such that the inverter produces armature currents consisting of synchronized currents producing rotating fields depending on a rotating position of a rotor and rotor exciting currents different in waveforms from the synchronized currents and superposed on the synchronized currents. At least the rotor exciting currents are powered on a second voltage from the DC power supply.

19 Claims, 33 Drawing Sheets

FOREIGN PATENT DOCUMENTS

| | | |
|---|---|---|
| JP | S63-144746 | 6/1988 |
| JP | H07-095790 | 4/1995 |
| JP | 10271781 A * | 10/1998 |
| JP | H11-018337 | 1/1999 |
| JP | 2005117843 A * | 4/2005 |

* cited by examiner

ROTARY ELECTRIC APPARATUS HAVING ROTOR WITH FIELD WINDING INDUCING CURRENT THERETHROUGH FOR GENERATING MAGNETIC FIELD

CROSS REFERENCES TO RELATED APPLICATIONS

The present application relates to and incorporates by reference Japanese Patent Applications Nos. 2006-265418 filed on Sep. 28, 2006, 2006-292548 filed on Oct. 27, 2006, and 2007-9105 filed on Jan. 18, 2007.

BACKGROUND OF THE INVENTION

1. Field of the Invention

The present invention relates to a rotary electric apparatus, and in particular, to a synchronous machine such as synchronous motor generator.

2. Description of the Related Art

There are a variety of types of rotary electric apparatuses and one type of such apparatuses is called synchronous machines. The synchronous machine is provided with a stator and a rotor, in which AC armature currents flow through the stator so that a rotary magnetic field is produced to rotate the rotor synchronously with the rotary magnetic field. As the rotors of the synchronous machines, there are known a magnet type rotor, a field winding type rotor, a reluctance type rotor, and a rotor in which those types are combined.

In the field winding type of synchronous machines, it is not necessary to mount costly permanent magnets to the rotor core. Thus, it is not necessary to take it into consideration the fact that resistance is generated against the centrifugal force applied to the permanent magnets. Besides those advantages, because the current made to flow through the field windings is able to arbitrarily control torque and voltage to be generated (induced), this field winding type of synchronous machine has a practical use in such applications as speed-variable rotary electric machines for generating power for driving automobiles. Japanese Patent Laid-open Patent Publication No. 7-95790 exemplifies a brush-less, easy-to-control torque synchronous machine of field winding type.

However, in the field winding type of synchronous machine disclosed by the above patent publication, it is necessary to flow multiphase AC currents through windings on the stator. The AC currents are in synchronism with the position of the rotor and are amplitude-modulated with the wave of a modulating signal whose frequency is biased. This current flow will cause larger ripples in the currents flowing through the rotor windings, causing larger ripples in the generated torque (torque ripples).

Another field winding type of synchronous machine is disclosed by Japanese Patent Laid-open Publication No. 11-18337, which is also provided with a structure for generating magnetic fields by supplying a current to a stator coil, without using magnetic fields from magnets. Because field windings are wound in the rotor, it is required for this type of machine to have a structure for securing the field winding to the rotor even if the centrifugal force is applied to the rotator. It is also required to assemble the field windings with the rotor.

To meet those requirements, the synchronous machine disclosed by Japanese Patent Laid-open Publication No. 11-18337 has structures shown in FIGS. 47A and 47B. As shown in FIG. 47A, a rotor 20X is divided into magnetic salient poles 21X and a rotor core 21X and field windings 22X are wound around the magnetic salient poles 211X, respectively, so that assembling work is improved. To prevent the field winding 22X from coming off outward in the radial direction due to the centrifugal force, a fan-shaped flange 211Y is integrally formed at the top of each magnetic salient pole 211X.

However, in the conventional structure of this rotor, there should be, in no small measure, a gap between a contact face 211Z of the magnetic salient pole 211X and a contact face 21Y of the rotor core 21X. This is because the separated members 211X and 21X are combined together when being assembled. The gap becomes magnetic resistance, reducing the magnetic flux passing therebetween, thus reducing an amount of available magnetic flux by the machine.

In addition, both faces 211Z and 21Y are located at the root portion of each magnetic salient pole 211X, which means that a slight gap between both members 211X and 21X gives rise to a large amount of reduction in the magnetic flux, deteriorating the performance of the machine.

The gap is liable to be larger, because both faces 211Z and 21Y are formed into a wedge shape. Adopting the wedge shape intends to prevent the magnetic salient pole 211X from coming off from the rotor core 21X.

SUMMARY OF THE INVENTION

The present invention has been made in light of the circumstances described above. Thus a first object of the present invention is to provide rotary electric machines capable of suppressing generation of ripples in the torque generated.

A second object of the present invention is to provide rotary electric machines, such as field winding type synchronous machines, which are able to prevent an increase in the magnetic resistance of the rotor core, while still securing field windings to the rotor and providing an improved work when assembling the field windings with the rotor.

In order to achieve the first object, the present invention provides, as a first aspect thereof, a rotary electric apparatus comprising: a synchronous machine having a stator with multiphase armature windings wound therein and a rotor with a field winding wound therein and rotatable around the stator; an inverter that produces armature currents as AC (alternating current) power from DC (direct current) power and supplies the armature currents to the armature windings; a DC power supply that outputs first voltage of a first voltage value and second voltage of a second voltage value higher than the first voltage value, the first and second voltages being the DC power; a current flow regulator that regulates directions of currents flowing through the field winding by the rotor exciting currents into one way, the current flow regulator being electrically connected to the field winding; and a controller that controls the inverter such that the inverter produces the armature currents consisting of synchronized currents producing rotating fields depending on a rotating position of the rotor and rotor exciting currents different in waveforms from the synchronized currents and superposed on the synchronized currents, at least the rotor exciting currents being powered on the second voltage.

In order to achieve the first object, the present invention provides, as a second aspect thereof, a rotary electric apparatus comprising: a synchronous machine having a stator with multiphase armature windings wound therein and a rotor with a field winding wound therein and rotatable around the stator; an inverter that produces armature currents as AC (alternating current) power from DC (direct current) power and supplies the armature currents to the armature windings; a DC power supply that outputs the DC power; a current flow regulator that regulates directions of currents flowing through the field winding by the rotor exciting currents into one way, the current flow regulator being electrically connected to the field winding; and a controller that controls the inverter such that the inverter produces the armature currents consisting of synchronized currents producing rotating fields depending on a rotating position of the rotor and rotor exciting currents different in waveforms from the synchronized currents and superposed respectively on the synchronized currents at regular intervals, the rotor exciting currents being controlled such that a value of each of the currents flowing through the field winding immediately before superposition of each rotor exciting current is more than ½ of each current made to flow initially by each rotor exciting current.

In order to achieve the second object, the present invention provides, as one aspect thereof, a synchronous machine, comprising: a stator equipped with armature windings wound therein; and a rotor, equipped with a field winding wound therein, having a rotor core formed into a cylindrical shape having a outer circumferential surface, the rotor core having an axial direction, a radial direction perpendicular to the axial direction, and a circumferential direction along the outer circumferential surface, a plurality of magnetic salient poles formed integrally with the rotor core and formed to protrude from the rotor core outward in the radial direction, the field winding including a plurality of coil segments each wound around each magnetic salient pole, a plurality of connecting members each located between mutually adjacent magnetic salient poles among the magnetic salient poles, and a plurality of securing members each located atop at least a coil segment of the field winding in the radial direction, the at least coil segment being located between each of the magnetic salient coils and each of the connecting members in the circumferential director, each connecting member connecting each securing member and the rotor core such that the securing members prohibit the coil segments of the field winding from moving outward in the radial direction.

DETAILED DESCRIPTION OF THE PREFERRED EMBODIMENTS

With reference to accompanying drawings, various preferred embodiments of the rotary electric apparatus according to the present invention will now be described. In the embodiments, the rotary electric apparatus is reduced into practice as a synchronous motor for generating drive power for vehicles. Such a motor is known as a "running motor" for vehicles.

First Embodiment

Referring to FIGS. 1-19, a rotary electric apparatus according to a first embodiment of the present invention will now be described.

Figure 1:
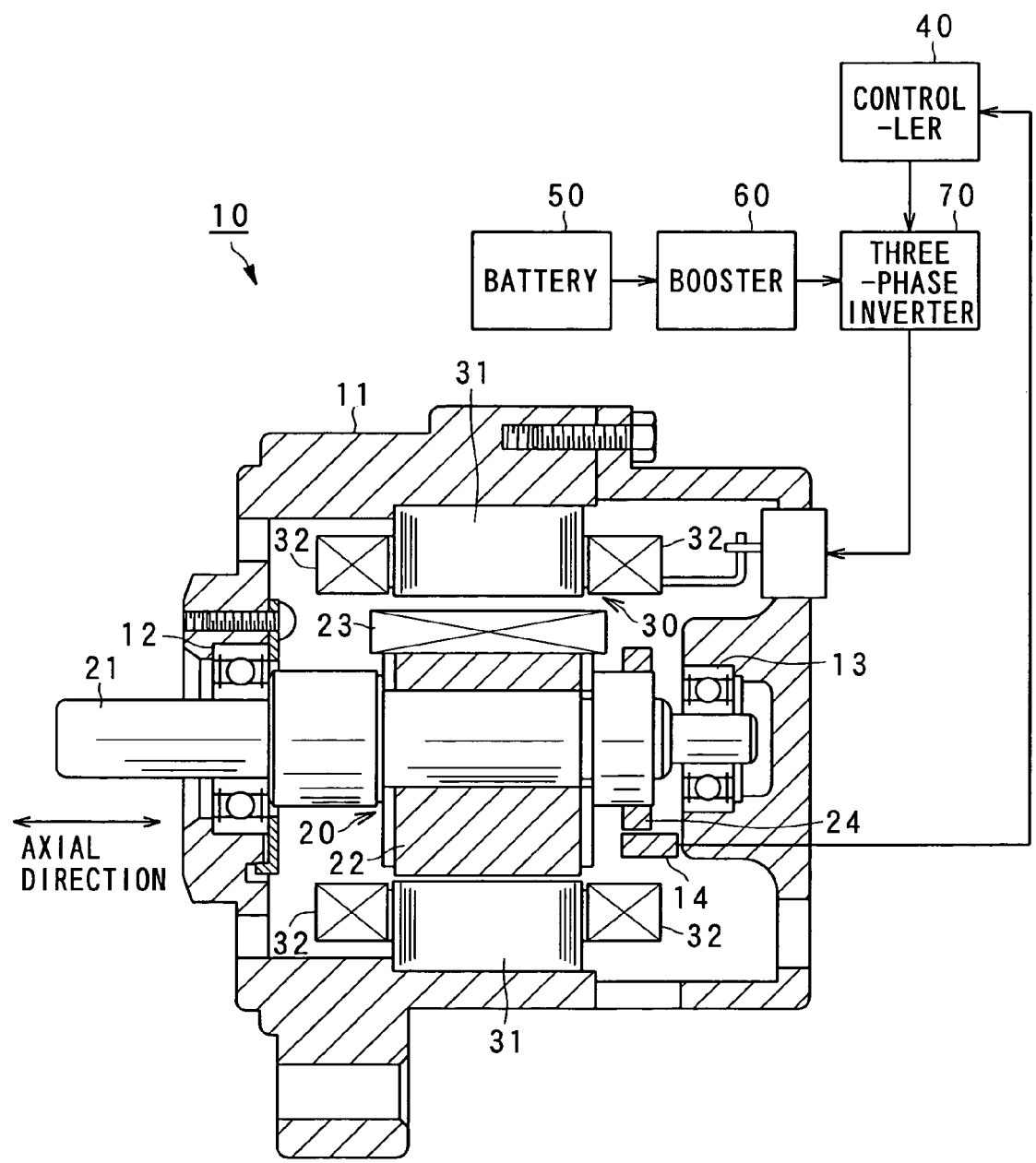
FIG. 1 is an axial sectional view showing the overall configuration of a synchronous motor according to a first embodiment of the present invention.

FIG. 1 shows the configuration of a rotary electric apparatus according to the present invention. The rotary electric apparatus includes a "synchronous motor (which is a field winding type of synchronous motor)" 10 according to a first embodiment. As shown, the synchronous motor 10 is equipped with a housing 11, a rotor 20, and a stator 30.

Of these components, the rotor 20 is provided with a shaft 21, a rotor core 22, and a rotor coil 23. The shaft 21 is rotatably supported to the housing 11 with a pair of bearings 12 and 13. The shaft 21 is a cylindrical member having a predetermined length along which an axial direction can be defined, whereby a radial direction can be defined as directions perpendicular to the axial direction and a circumferential direction around the shaft 21 (refer to FIGS. 1 and 2). These primary directions can also be defined as to the rotor core 22 and rotor 20.

A magnetic ring plate 24 is fixedly attached on and around the shaft 21, and salient poles are placed in the outer surface of this magnetic ring plate 24 with a predetermined interval arranged therebetween. A rotating position sensor 14 is positioned to face the outer circumferential surface of the magnetic ring plate 24. The rotating position sensor 14 detects the passage of the salient poles to detect an electric signal showing the rotating position of the rotor 20, and transmits the detected signal to a controller 40.

Figure 2:
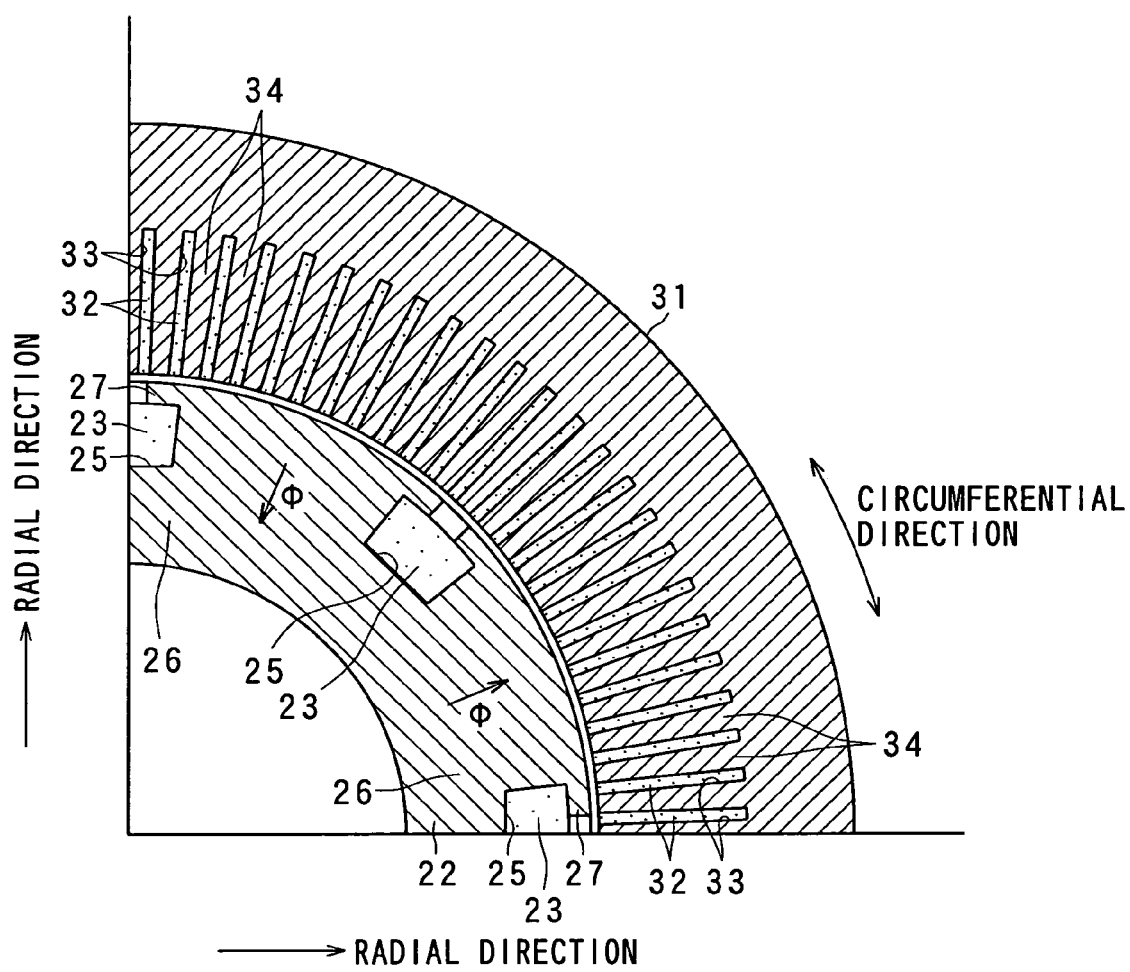
FIG. 2 is a partial sectional view of the synchronous motor taken along a radial reaction of the motor.

As shown in FIG. 2, in the rotor core 22, a plurality of rotor coil accommodating grooves 25 are formed to be positioned on the outer circumferential side thereof and to open outside and radially outward and to run along the axial direction of the rotor core 22. Between the mutually-adjacent rotor coil accommodating grooves 25 in the circumferential direction of the rotor core 22, a rotor-core tooth portion 26 is formed. On the outermost circumferential part of the rotor core 22, flange portions 27 are attached to extend from both sides of each rotor coil accommodating groove 25 so as to narrow the opening thereof. The respective rotor coil accommodating grooves 25 are charged with the rotor coil 23 in a wound form therein. The rotor coil 23 is in charge of producing a field magnetic flux Φ in the respective rotor-core teeth portions 26. To achieve this production of the field magnetic flux, each coil segment of the rotor coil 23 is wound around each rotor-core tooth portion 26 in a square form when viewed in a radial direction of the rotor 22. Incidentally the rotor coil 23 may be wound in another form such as a switchback form, not being limited to the square form.

The stator 30 is located on the outer side of the rotor 20 in the radial direction. The stator 20 is composed of a stator core 31 and stator coils 32. The stator core 31 is a cylindrical member and secured to the inner circumferential surface of the housing 11. A plurality of slots 33 are formed in the stator core 31 to allow one end of each slot to open outside and radially inward and to run in the axial direction of the stator core 31 (i.e., the rotor). Between the mutually adjacent slots 33 in the radial direction, a stator-core tooth portion 34 is formed. The stator coil 32 is composed of three-phase phase coils 32U, 32V and 32W which are wound through the slots 33 in turn. By flowing current through the stator coil 32, the stator-core tooth portions 34 are magnetized to allow the tooth portions 34 to be produced as salient poles.

Figure 3:
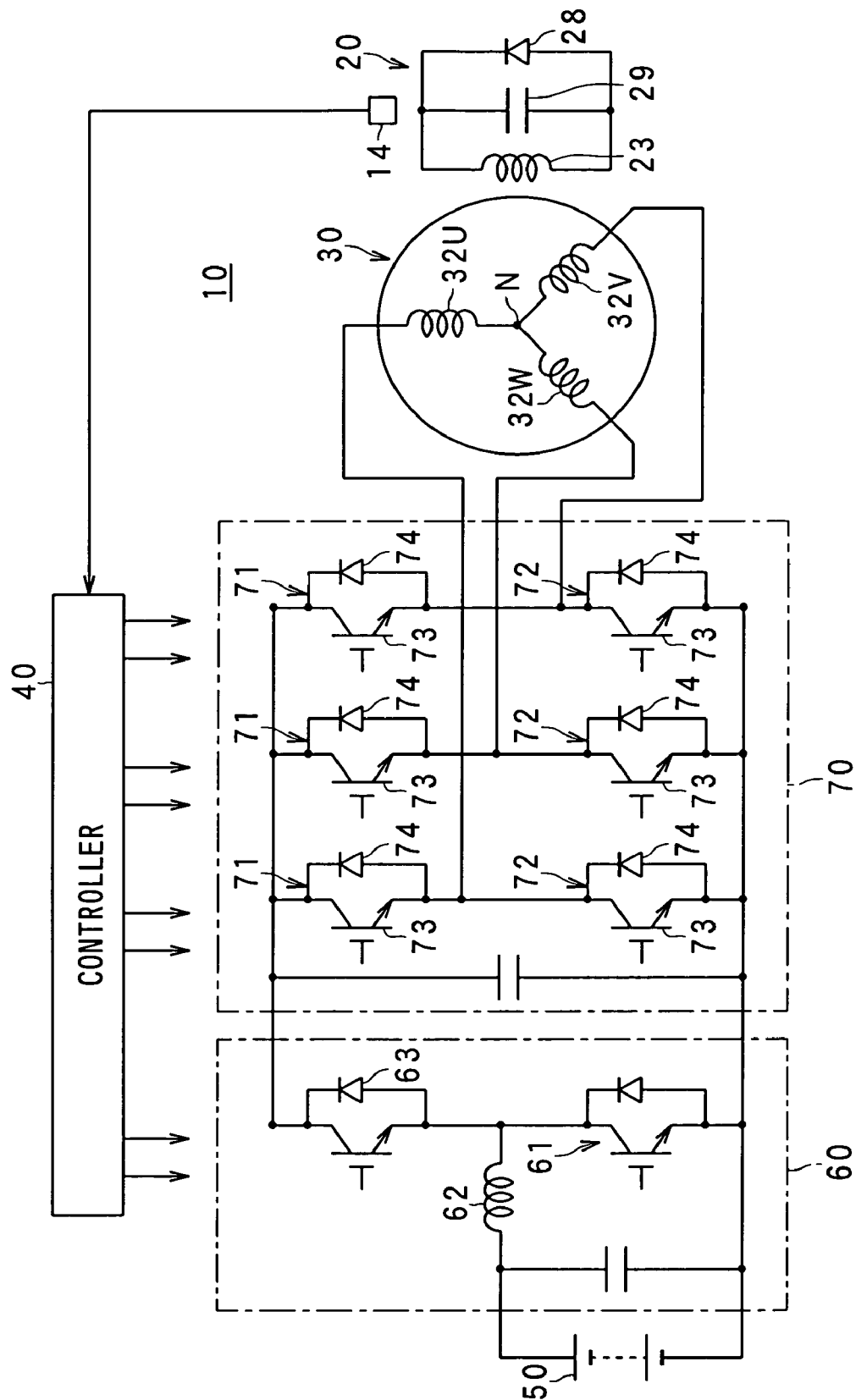
FIG. 3 is a circuit diagram showing components necessary for controlling the motor in the first embodiment.

As shown in FIG. 3, the stator coil 32 (i.e., 32U, 32V and 32W) is arranged in the stator 30 in a Y-connection (star-wired) form, in which a U-phase coil 32U, a V-phase coil 32V and a W-phase coil 32W are eclectically connected to a neutral point N. As shown in FIGS. 1 and 3, the rotary electric apparatus also comprises a battery 50, a booster 60, and a three-phase inverter 70, in which the booster 60 and three-phase inverter 70 are placed between the battery 50 and the external lead terminals from the respective phase coils 32U, 32V and 32W to hold electrical connections therebetween. The three-phase inverter 70 comprises three upper arm elements 71 for switching and three lower arm elements 72 for switching, and each arm element 71 (72) is essentially composed of an IGBT (insulated gate bipolar transistor) 73 and a flywheel diode 74. Of course, the IGBT can be replaced by a MOS (metal-oxide semiconductor) transistor.

The inverter 70 is electrically connected to the battery 50 via the booster 60. The booster 60 is arranged to boost the voltage, which is given from the battery 50, from a first voltage V1 to a second voltage V2. This booster 60 is equipped with a boosting electric switch 61, an inductance 62, and a diode 63, in which turning on the boosting switch 61 allows the inductance 62 to accumulate energy therein and turning off the boosting switch 61 allows the accumulated energy in the inductance 62 to be discharged by way of diode 63. This way of boosting the voltage is called "boosting chopper technique." By way of example, the first voltage V1 is set to 200 V and the second voltage V2 is set to 600 V, which is three times larger than the first voltage V1. The voltage boosted by the booster 60 is provided to the inverter 70.

The rotor coil 23 is not connected to the battery 50 and both ends of the rotor coil 23 are short-circuited by a diode 28, as shown in FIG. 3. In parallel with the diode 28, a current smoothing capacitor 29 is connected. The diode 28 performs half-wave rectification on AC current induced by the rotor coil 23, thus producing the magnetic poles in the rotor 20 such that the rotor-core teeth portions 26 mutually adjacent in the circumferential direction of the rotor 20 are magnetically excited at N- and S-poles by turns.

The controller 40 is formed to receive from the rotating position sensor 14 an electric signal indicating the current position of rotation taken by the rotor 20. And the controller 40 intermittently controls the operations of the inverter 70 to supply synchronized armature currents ("synchronized currents") to the stator coils 32, which armature currents respond to the rotating position of the rotor 20. By intermittently controlling the inverter 70 in accordance with the rotating positions of the rotor 20, the rotor 20 is caused to generate rotation torque thereat. In addition, the controller 40 is also in charge of controlling another intermittent control operation of the inverter 70, with which a second AC current (hereinafter, called "rotor exciting currents"), which are not in synchronism with the rotation of the rotor 20, is made to flow through the stator coils 32. Accordingly, the armature currents flowing through the stator coils 32 are a sum of each synchronized current and each rotor exciting current, respectively. Likewise, armature voltages applied to the stator coil 32 is a sum of each synchronized voltage which is for generating torque and each rotor exciting voltage which is for generating the rotor exciting current.

For example, the controller 40 includes a CPU (central processing unit), ROM (read-only memory) and RAM (random access memory) which compose a computer system to which programs for achieving the above control operations are given. The programs executed by the CPU are previously stored as source codes in the ROM.

Figure 4:
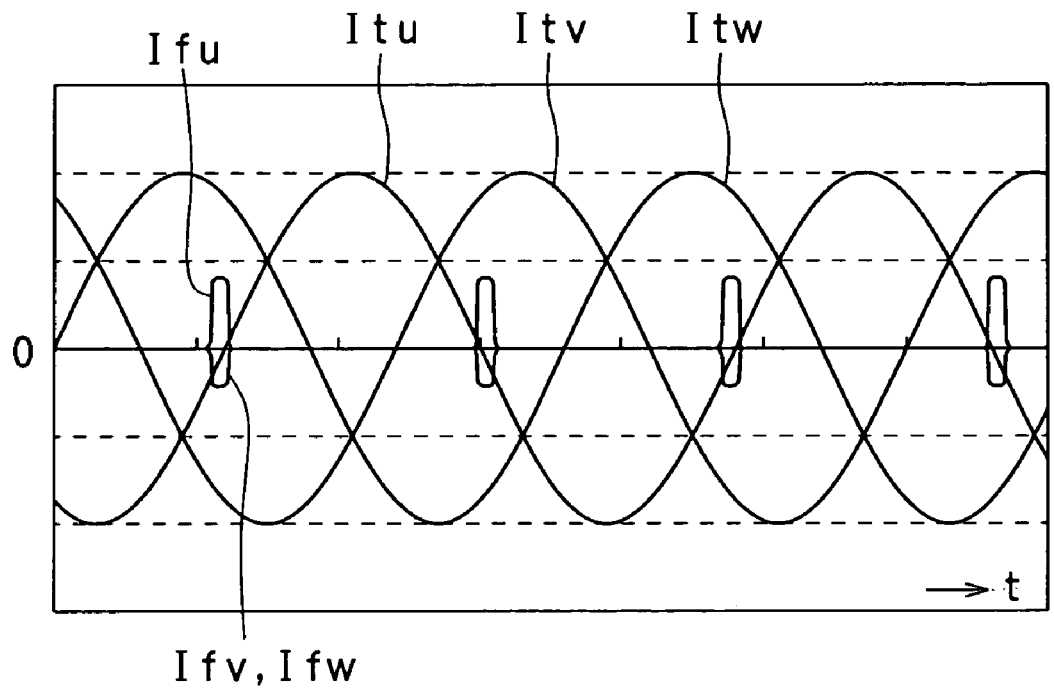
FIG. 4 is a graph exemplifying control for supplying the three-phase armature currents.
Figure 5:
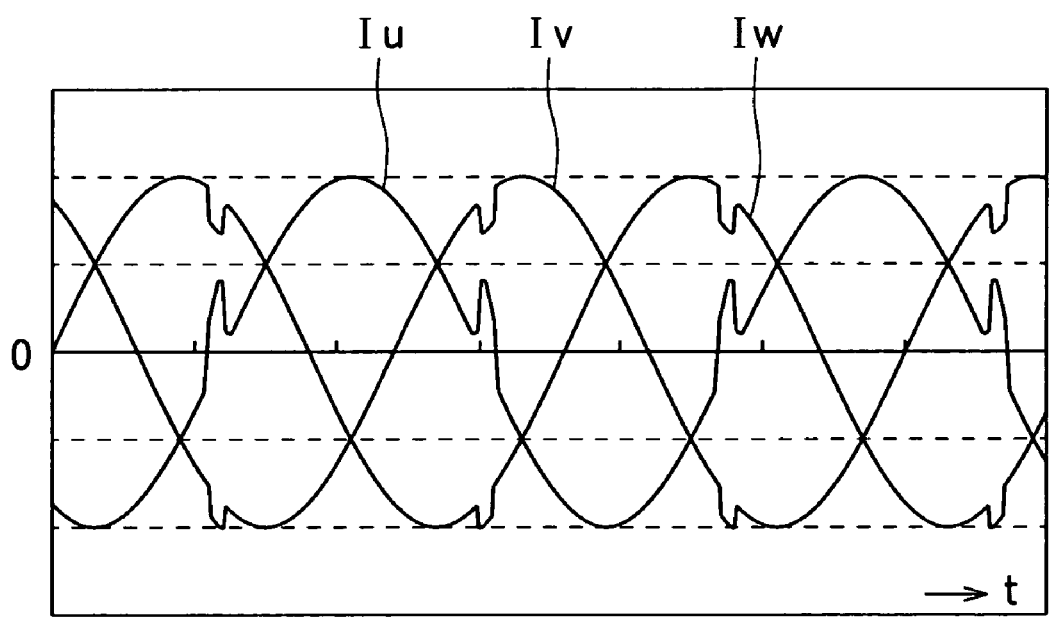
FIG. 5 is a graph showing three-phase armature currents produced by superposing rotor exciting currents on phase synchronized currents.

Referring to FIGS. 4 and 5, how the inverter 70 controls supply of the three-phase armature current will now be described.

As shown in FIG. 4, the synchronized current is made up of synchronized currents Itu, Itv and Itw for respective phases, which are provided as sinusoidal-waveform currents for generating torque. As stated, these synchronized currents Itu, Itv and Itw are generated by controlling the inverter 70 intermittently depending on the rotating positions of the rotor 20. Meanwhile, the rotor exciting current is composed of currents Ifu, Ifv and Ifw, which are pulsed-waveform currents decided in advance every phase. Under intermittent control of the inverter 70, the currents Ifu, Ifv and Ifw are generated momentarily at phases which do not contribute the generation of the torque at the rotor 20. That is, exciting magnetic flux generated by each of the rotor exciting currents Ifu, Ifv and Ifw are made to operate in the d-axis direction of the rotor 20, so that no torque is generated in response to these currents Ifu, Ifv and Ifw. Making the rotor exciting currents Ifu, Ifv and Ifw flow through the stator coil 32 makes it possible to adjust the magnetic flux passing through the rotor coil 23. This is able to generate, at the rotor coil 23, the currents having directions to cancel changes in the magnetic flux. The currents generated at the rotor coil 23 are subjected to the half-wave rectification, and the rectified currents are used to magnetically generate the rotor-core tooth portions 26.

As shown in FIG. 5, in the respective phase currents Iu, Iv and Iw which actually flow through the respective phases of the stator 30 as the armature currents, the rotor exciting currents Ifu, Ifv and Ifw are superposed (i.e., combined or superimposed) on the synchronized currents Itu, Itv and Itw to the respective phases, phase by phase, respectively (i.e., Ifu+Itu, Ifv+Itv, and Ifw+Itw). Supplying the respective phase currents Iu, Iv and Iw to the stator coils 32 allows the rotor 20 to be magnetically excited, thus allowing the torque to be generated at the rotor 20.

Referring to FIGS. 6-12, how to superpose the rotor exciting current Ifu, Ifv and Ifw on the synchronized currents Itu, Itv and Itw to the respective phases will now be described.

Figure 6:
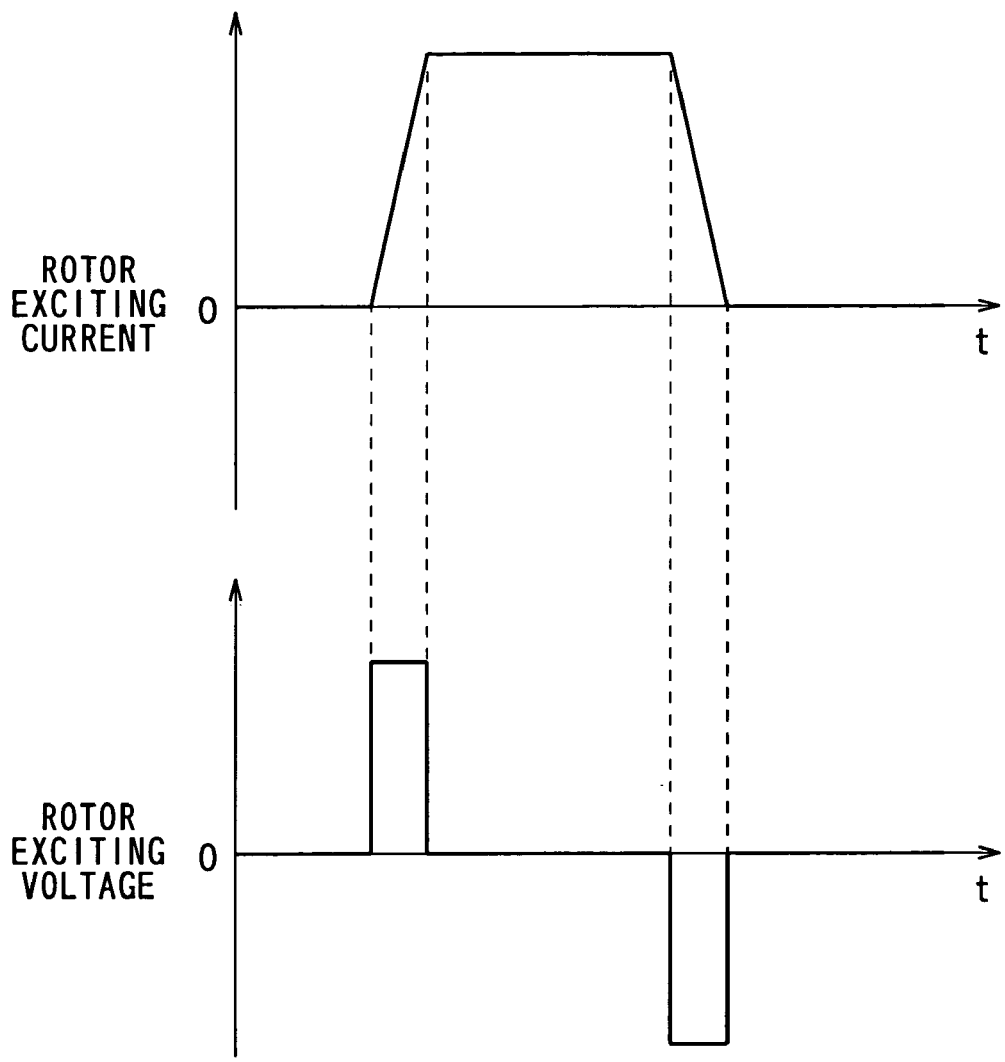
FIG. 6 exemplifies the waveforms of a rotor exciting current and a rotor exciting voltage.
Figure 7:
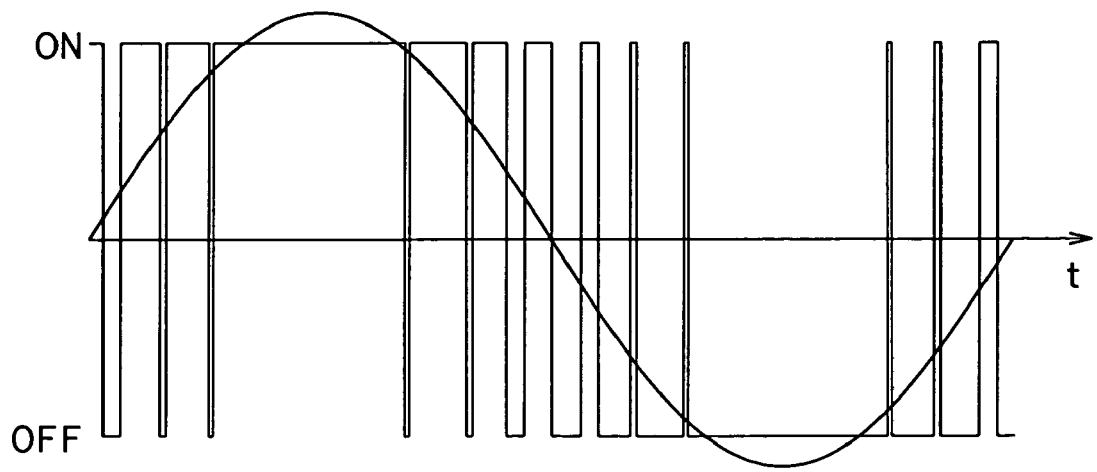
FIG. 7 exemplifies the waveform of a PWM phase voltage producing a phase synchronized current.

FIG. 6 exemplifies the waveform of each rotor exciting current which is produced as a pulsed current. To supply this pulsed rotor exiting current to the rotor 20, each stator coil 32 is given pulsed rotor-exciting voltages whose polarities are opposite to each other (i.e., a positive pulsed voltage and a negative pulsed voltage). Meanwhile, the sinusoidal-waveform synchronized currents shown in FIG. 4 is generated by applying to each stator coil a PWM (pulse width modulation) phase voltage of which waveform is shown in FIG. 7.

Figure 8:
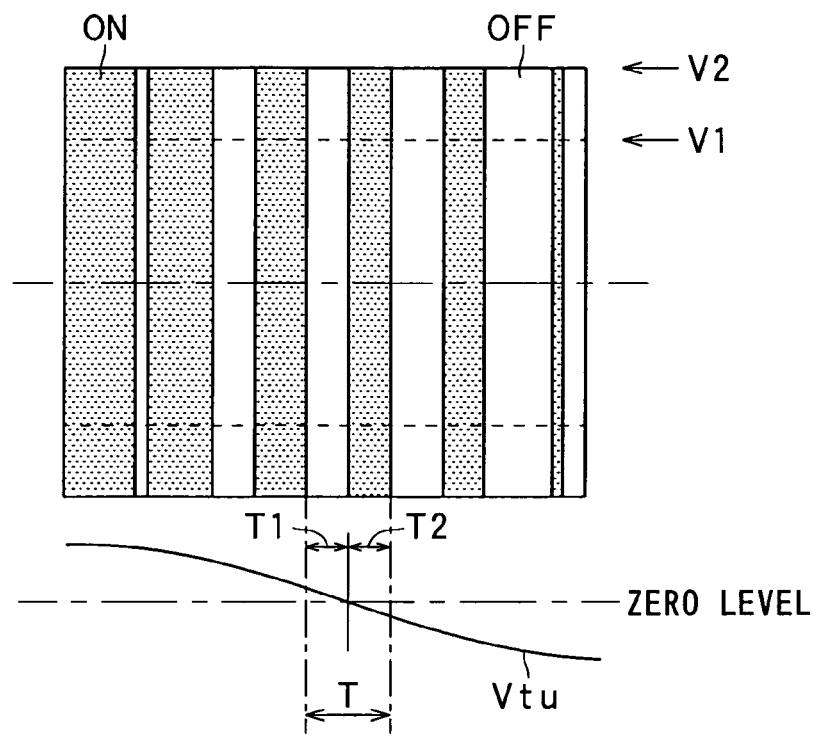
FIG. 8 exemplifies the waveform of the PWM phase voltage and part of a synchronized voltage in the vicinity of a zero-crossing point of the waveform.

FIG. 8 shows part of the waveform of a certain phase sinusoidal synchronized voltage (in this embodiment, the voltage Vtu), which is provided in the vicinity of a zero-crossing point thereof, and part of the waveform of the PWM phase voltage to produce the part of the phase sinusoidal synchronized voltage. The waveform of the PWM phase voltage has black-painted ranges each showing an "on-period" of the PWM phase voltage and blank ranges each showing an "off-period" of the PWM phase voltage.

Figure 9:
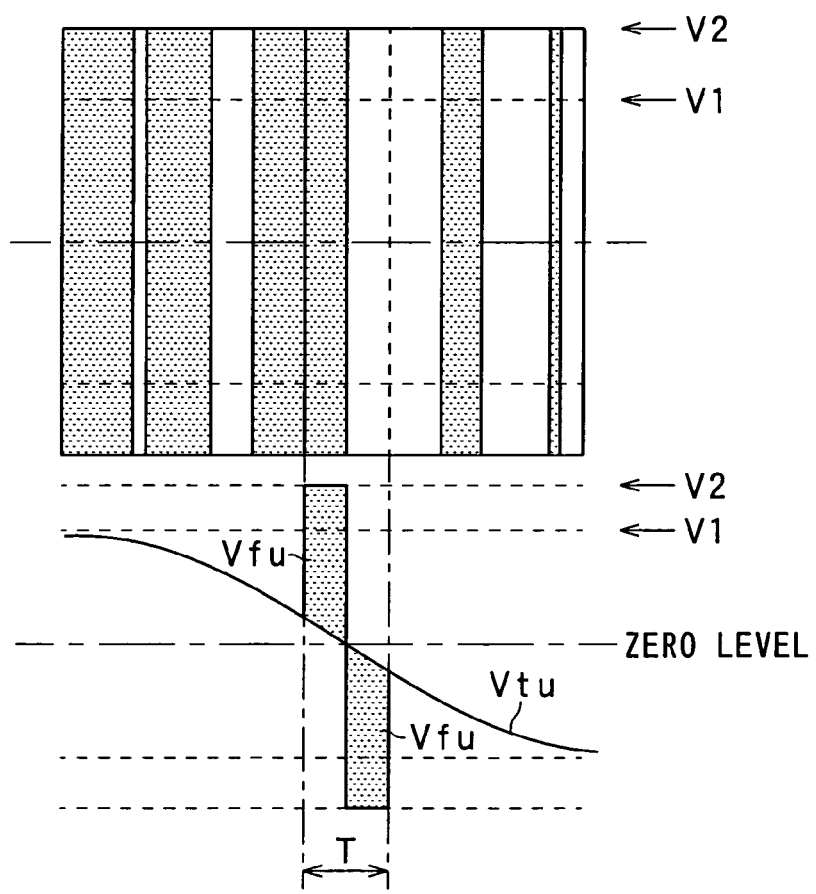
FIG. 9 shows a waveform in which rotor exiting voltages are added in a superposing manner to the waveform shown in FIG. 8.
Figure 10:
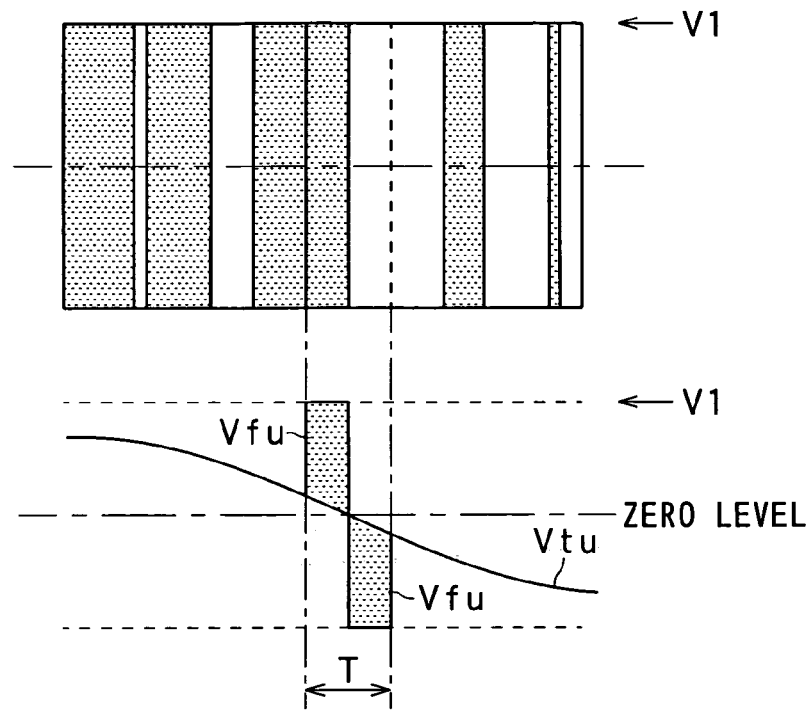
FIG. 10 shows a waveform according to a comparative example 1 in which rotor exiting voltages are added in a superposing manner to the waveform shown in FIG. 8.
Figure 11:
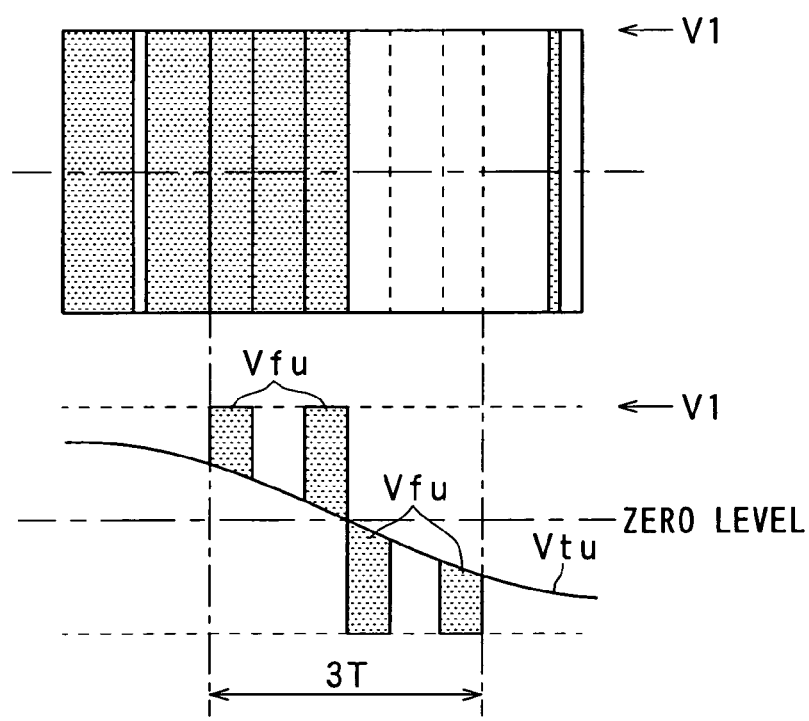
FIG. 11 shows a waveform according to a comparative example 2 in which rotor exiting voltages are added in a superposing manner to the waveform shown in FIG. 8.

FIG. 9 details part of the waveform of the PWM phase voltage with a rotor exciting voltage Vfu superposed, in the vicinity of the zero-crossing point of the synchronized voltage Vtu shown in FIG. 8. In the example shown in FIG. 9, a positive pulsed voltage and a negative pulsed voltage, which function as the rotor exciting voltage Vfu, are superposed during a superposition (combination or superimposing) period preset in the vicinity of the zero-crossing point of the sinusoidal synchronized voltage Vtu. Specifically, during a phase period T1 in which the synchronized voltage Vtu is positive, the positive pulsed voltage is superposed, which is achieved by converting the off-period of the PWM waveform to its on-period. And during a phase period T2 in which the synchronized voltage Vtu is negative, the negative pulsed voltage is superposed, which is achieved by converting the on-period of the PWM waveform to its off-period.

In the foregoing, for the sake of simplification, the explanation has been given as to how the rotor exciting voltage Vfu is superposed only in the vicinity of the zezo-crossing point of the synchronized voltage Vtu. However at other time instants, similar operations to the above are applied to the superposition of the rotor exciting voltage Vfu on the synchronized voltage Vtu.

In the present embodiment, the rotor exciting currents Ifu, Ifv and Ifw are superposed only during the period T which is relatively shorter than the respective periods of the synchronized currents Itu, Itv and Itw. Practically, when the rotor 20 is under its rotation, the rotor exciting currents Ifu, Ifv and Ifw are superposed only during a period which is shorter than a period of time (t0). During this period of time t0, the rotor-core tooth portions 26 pass over mutually-adjacent stator-core tooth portions 34 of the stator 30. By way of example, the period T is ¼ of the period of time t0.

(Simulation Results)

Simulation was executed on the motor 10 according to the present embodiment. The results from the simulation are as follows. The simulation involved tests of two comparative examples 1 and 2 each also directed to a synchronous motor. The synchronous motor simulated by each comparative example has no booster between the battery 50 and the inverter 70 (refer to FIG. 3) so that the battery 50 directly powers the inverter 70. That is, in the respective comparative examples 1 and 2, the first voltage V1 of approx. 200 V was applied to the inverter 70, while in the present embodiment, the second voltage V2 of approx. 600 V was applied to the inverter 70.

In the comparative example 1, the remaining configurations and switching control executed by the inverter 70 are the same as those in the present embodiment. This can be illustrated by FIG. 10, in which the amplitudes of the PWM phase voltage waveform (applied voltage), which amplitudes correspond to the synchronized voltage Vtu and the rotor exciting voltages Vfu, are different from those of the present embodiment. The widths (durations) of the PWM phase voltage waveform, during which of widths the rotor exciting voltages Vfu are superposed, are the same as those of the present embodiment.

In the comparative example 2, in addition to the direct power supply from the battery 50 to the inverter 70, the comparative example 2 differs from the present embodiment in the duration of application of the rotor exciting voltage Vfu to each of the stator coils 32. This can be illustrated in FIG. 11, in which the amplitudes (applied voltage) of the widths (durations) of the PWM phase voltage waveform differ from those of the present embodiment. Practically, compared to the present embodiment, the period T, during which the positive and negative pulsed voltages of the rotor exciting voltage Vfu are applied, is set to a period 3T, which is three times longer than the period T. The voltages Vfu generate pulsed rotor exciting currents Ifu, as stated.

Results of Simulation on the Present Embodiment

Figure 12:
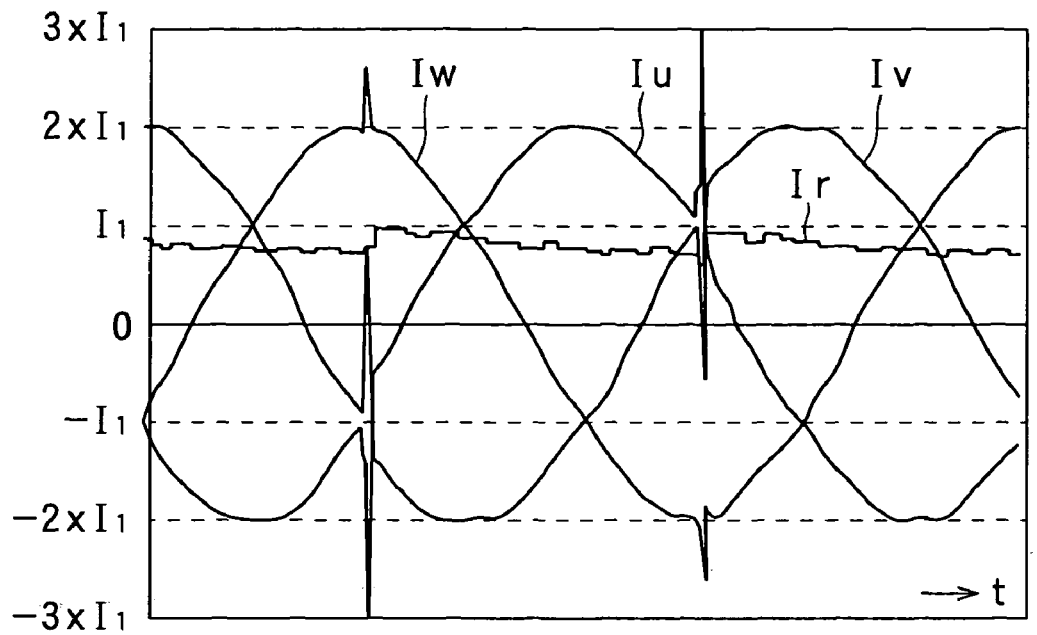
FIG. 12 is a graph showing waveforms of respective phase currents in which rotor exciting currents are superposed (i.e., combined or superimposed) on synchronized currents, respectively, and an exciting current flowing through a rotor coil in the first embodiment.

FIG. 12 shows various current waveforms resultant from the simulation according to the present embodiment based on the present invention, which current waveforms include the respective phase currents Iu, Iv and Iw produced by superposing the rotor exciting currents Ifu, Ifv and Ifw on the phase synchronized currents Itu, Itv and Itw, respectively, and an exciting current Ir caused through the rotor coil 23. In addition, FIG. 13 shows a waveform of torque caused in the rotor 20 according the present embodiment and FIG. 14 magnifies an encircled part A in the waveform of FIG. 13.

It is understood from FIG. 12 that when the phase currents Iu, Iv and Iw, in which the pulsed rotor exciting currents Ifu, Ifv and Ifw are superposed on the synchronized currents Itu, Itv and Itw, respectively, are made to pass through the stator coils 32, the excitation current Ir flows through the rotor coil 23. It is also understood from FIG. 12 that the excitation current Ir changes at timings when the rotor exciting currents Ifu, Ifv and Ifw are superposed.

Figure 13:
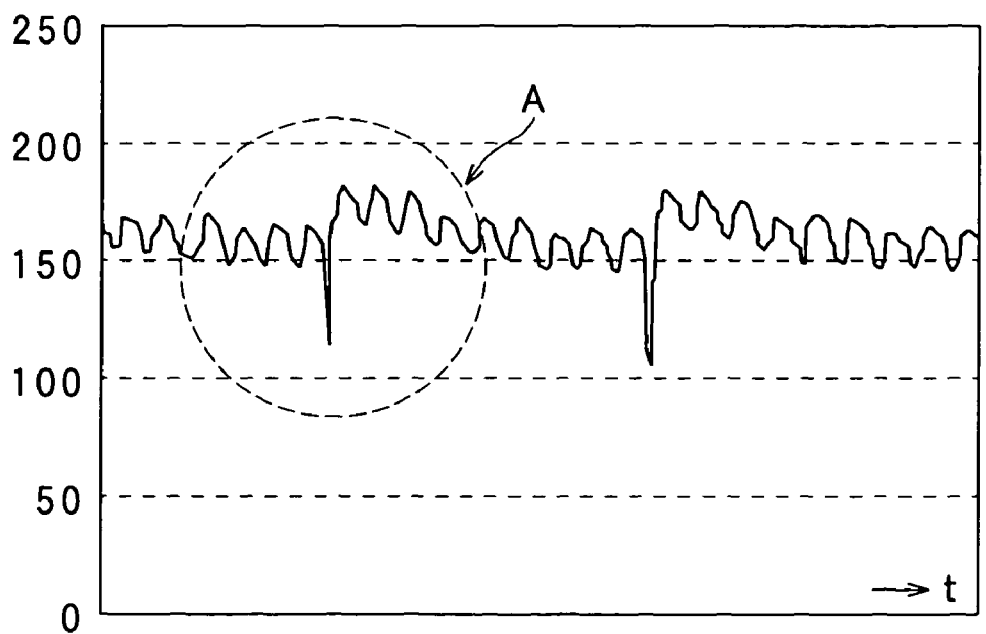
FIG. 13 is a graph showing torque generated in a rotor in the first embodiment.
Figure 14:
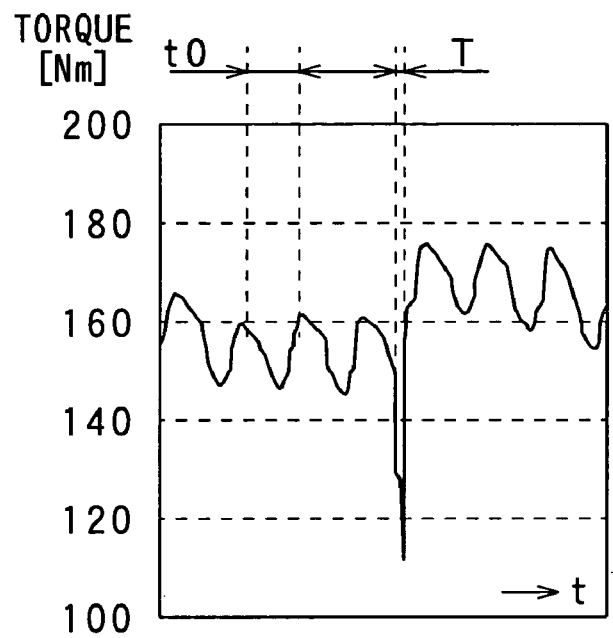
FIG. 14 is an enlarged view of an "A" part in FIG. 13.

FIGS. 13 and 14 show ripples (fluctuations) in the generated torque (i.e., torque ripples), which is repeatedly at shorter periods to and caused in the rotor 20. The rotor 20 rotates in response to a pulling force and a repulsion force provided by each of the salient poles in the stator core tooth portions 34. The torque ripples will be caused when each magnet pole produced in each rotor-core tooth portions 26 passes by the slot 33 and stator-core tooth portion 34 by turns. Further, FIGS. 13 and 14 reveal that torque ripples are caused which change largely and shapely more than the torque ripples caused when passing by the slot 33 and stator-core tooth portion 34 by turns. Those larger and sharper torque ripples are generated in the rotor 20 due to fluctuations in the exciting current Ir.

However in the present embodiment, as illustrated in FIG. 14, the period T for superposition of the rotor exciting current is set to a time period shorter than the period of time t0 during which each rotor-core tooth portion 26 passes by the two mutually adjacently positioned stator-core tooth portions 34. This setting makes the width of each of the torque ripples smaller, as illustrated in FIG. 13, thereby reducing the vibration and noise of the synchronous motor down to practically allowable levels.

Results of Simulation on Comparative Example 1

Figure 15:
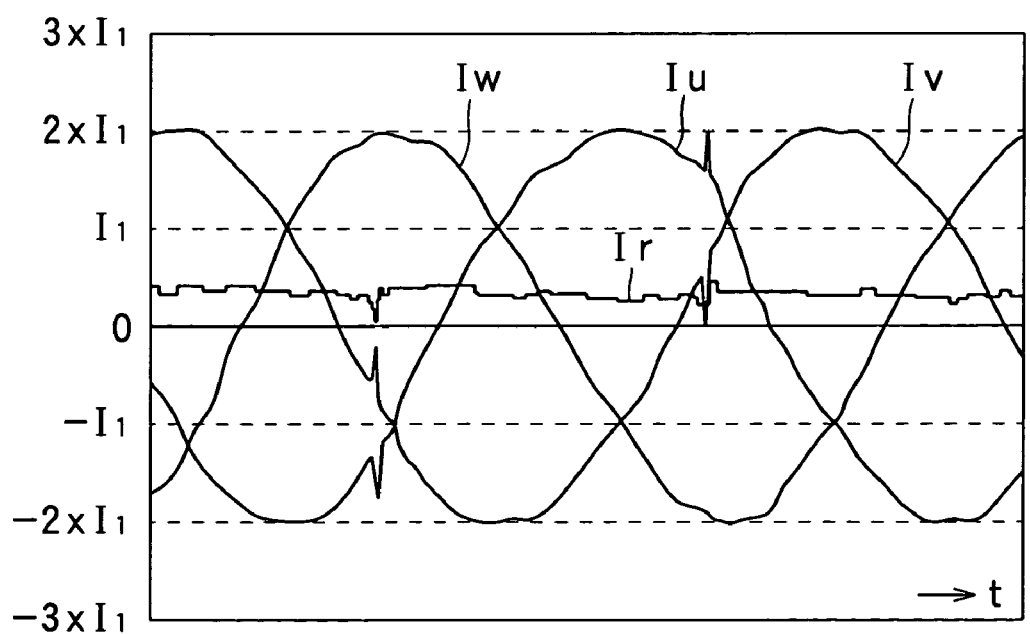
FIG. 15 is a graph showing waveforms of respective phase currents in which rotor exciting currents are superposed on synchronized currents, respectively, and an exciting current flowing through a rotor coil in the comparative example 1.
Figure 16:
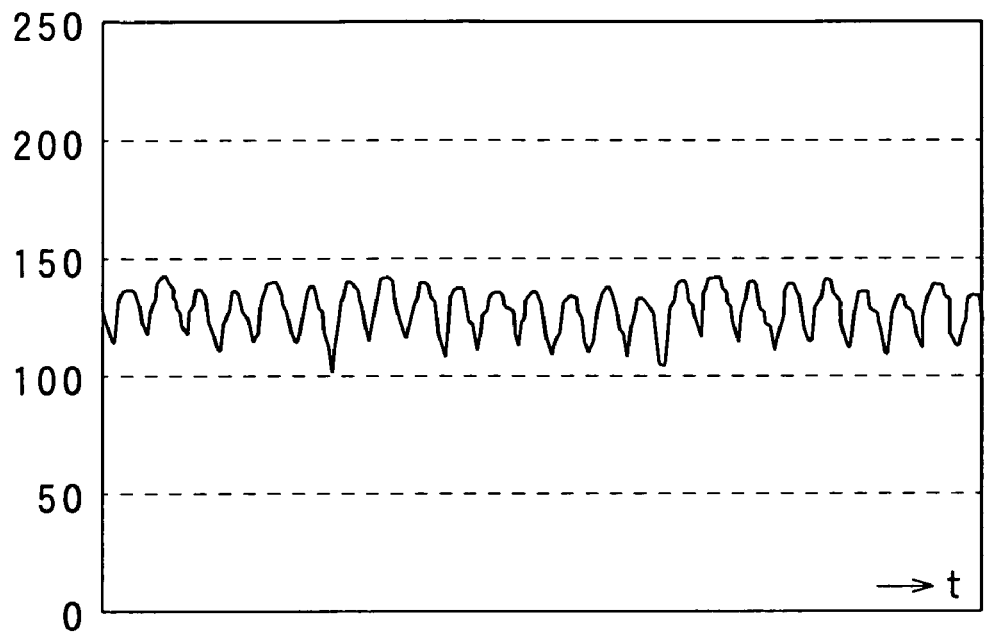
FIG. 16 is a waveform of torque generated in the rotor in the comparative example 1.

FIG. 15 shows various current waveforms resultant from the simulation according to the comparative example 1, which include the respective phase currents Iu, Iv and Iw produced by superposing the rotor exciting currents Ifu, Ifv and Ifw on the phase synchronized currents Itu, Itv and Itw, respectively, and an exciting current Ir caused through the rotor coil 23. In addition, FIG. 16 shows a waveform of torque caused in the rotor 20 according the comparative example 1

As shown in FIG. 15, even in the comparative example 1, it is understood that making the phase currents Iu, Iv and Iw flow through the stator coils 32 will cause the exciting current Ir to flow through the rotor coil 23, which phase currents Iu, Iv and Iw are subjected to the superposition. Like the present embodiment, it is understandable from FIG. 15 that, at timings when the rotor exciting currents Ifu, Ifv and Ifw are superposed, the exciting current Ir fluctuates.

However, this comparative example 1 has no booster between the battery 50 and the inverter 70 to directly power the inverter 70. Hence, when compared to the present embodiment, the rotor exciting currents Ifu, Ifv and Ifw become smaller, lowering the exiting current Ir. As a result, as shown in FIG. 16, the torque itself generated in the rotor 20 is forced to be smaller. Therefore, there is a fear that the torque runs short in a situation requiring a larger amount of torque.

Results of Simulation on Comparative Example 2

Figure 17:
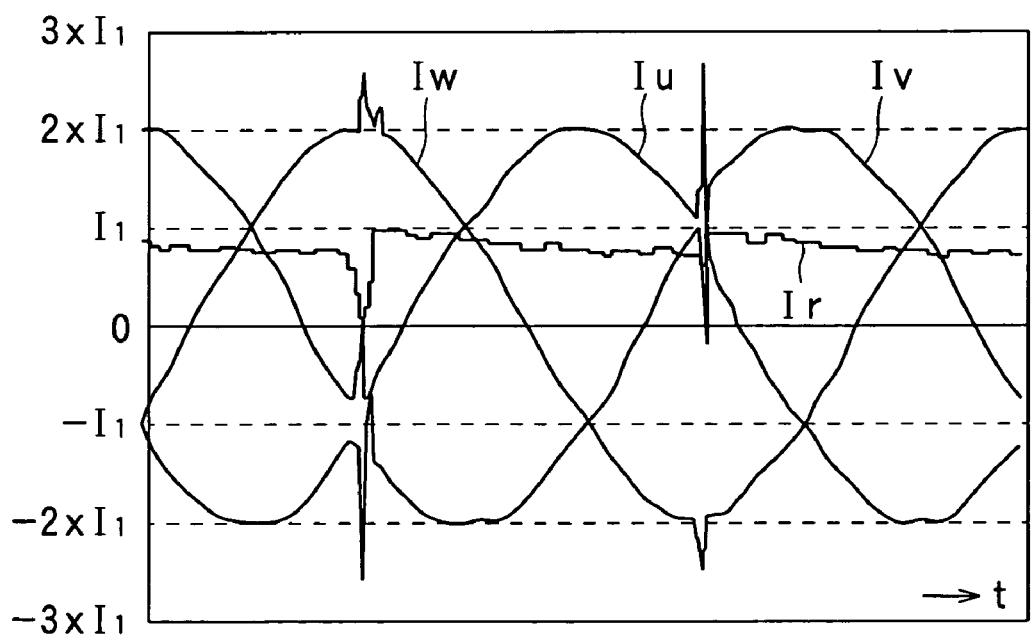
FIG. 17 is a graph showing waveforms of respective phase currents in which rotor exciting currents are superposed on synchronized currents, respectively, and an exciting current flowing through a rotor coil in the comparative example 2.
Figure 18:
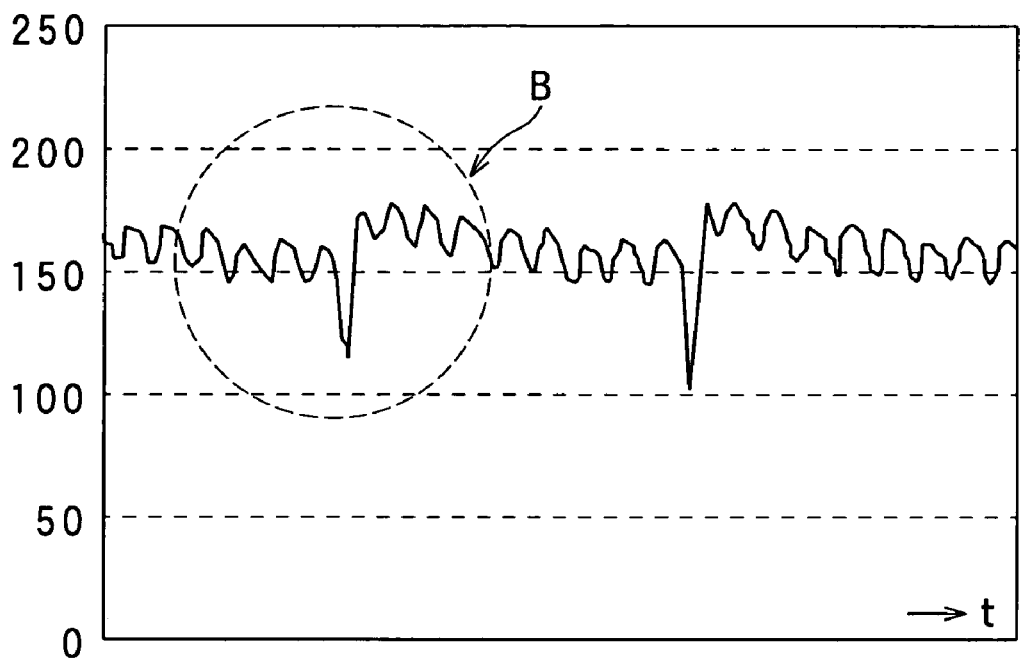
FIG. 18 is a waveform of torque generated in the rotor in the comparative example 2.

FIG. 17 shows various current waveforms resultant from the simulation according to the comparative example 2, which include the respective phase currents Iu, Iv and Iw produced by superposing the rotor exciting currents Ifu, Ifv and Ifw on the phase synchronized currents Itu, Itv and Itw, respectively, and an exciting current Ir caused through the rotor coil 23. In addition, FIG. 18 shows a waveform of torque caused in the rotor 20 according the comparative example 2 and FIG. 19 magnifies an encircled part B in the waveform of FIG. 18.

In the comparative example 2, as stated, the width (duration; 3T) of the PWM phase voltage waveform was determined about three times larger than that (T) of the present embodiment and the comparative example 1. During the period 3T on this width, the rotor exciting voltage Vfu is superposed. Thus, as shown in FIG. 17, the rotor exciting currents Ifu, Ifv and Ifw become larger, resulting in that the exciting current Ir keeps as much amount as in the present embodiment. And, as shown in FIG. 18, the torque caused in the rotor 20 keeps an amount as much as in the present embodiment, which is thanks to the larger exciting current Ir. Thus, increasing the superposition period for the rotor exciting currents Ifu, Ifv and Ifw allows the toque generated in the rotor 20 to increase up to a practically usable level.

Figure 19:
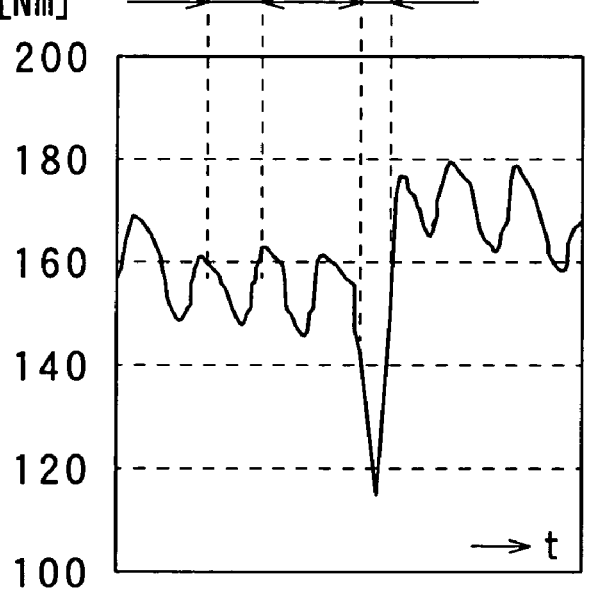
FIG. 19 is an enlarged view of a "B" part in FIG. 18.

However, the comparative example 2 revealed a drawback. As understood from FIG. 17, in association with the approximately three-times superposition period 3T (width for the superposition) for the rotor exciting currents Ifu, Ifv and Ifw, a duration was caused during which the exciting current Ir through the rotor coil 23 fluctuates. Thus, as shown in FIG. 19, the temporal width (period of time) of each torque ripple generated in the rotor 20 due to the fluctuations in the exciting current Ir was also decided approximately three times larger than the temporal width T of each torque ripple in the present embodiment. Thus it is estimated that the vibration and noise should have larger influence, in cases where an application needs a larger amount of torque, causing a limit to practical applications.

As clear from the above simulation results, the synchronous motor according to the present embodiment is able to provide various good operations and advantages.

In the present embodiment, the second voltage V2 boosted by the booster 60 is applied to the inverter 70. Applying a higher voltage to the inverter 70 in this way makes it possible to increase the amounts of the rotor exciting currents Ifu, Ifv and Ifw. Thus the period of time (T), which is necessary for superposition of the rotor exciting currents Ifu, Ifv and Ifw to induce predetermined induction currents through the rotor coil 23, can be lessened. Though the exciting current Ir still fluctuates at the timings when the currents Ifu, Ifv and Ifw are superposed, the configuration according to the present embodiment is able to reduce the period of time during which each fluctuation lasts. This will lead to a reduction in a period of time during which each torque ripple lasts. A reduction in the torque ripples is helpful for suppressing the vibration and noise of the motor 10.

In the present embodiment, the rotor exciting currents Ifu, Ifv and Ifw are superposed only during the period of time relatively shorter than the period of each of the synchronized currents Itu, Itv and Itw. This reduces a period of time during which the exciting current Ir fluctuates, lessening the time period during which the torque ripples are generated in the rotor 20.

In the rotor 20, a torque ripple of a shorter period is caused and repeated every time the magnetic pole produced in each rotor-core tooth portion 26 passes by each slot 33 and each stator-core tooth portion 34 in turn. Besides this shorter-period torque ripple, torque ripples are caused in the rotor 20 in response to superposing the rotor exciting currents Ifu, Ifv and Ifw. In this regard, in the present embodiment, the superposition of the rotor exciting currents Ifu, Ifv and Ifw is continued only for the period shorter than the period of time t0. Thus the temporal width (i.e., generation time) of each torque ripple caused responsively to superposing the rotor exciting currents Ifu, Ifv an Ifw can be made smaller than the temporal width of each shorter-period torque ripple caused by passing by each stator core tooth portion 34. It is therefore possible to reduce or avoid a situation where vibration and noise caused from the motor 10, which is caused by the torque ripples due to superposing the rotor exciting currents Ifu, Ifv and Ifw, become noticeable more than those due to the periodic torque ripples.

In the present embodiment, the rotor exciting currents Ifu, Itv and Itw, which are decided phase by phase, are superposed on the synchronized currents Itu, Itv and Itw. This leads to producing desired waveforms of the respective phase currents Iu, Iv and Iw. For example, there can be formed desired current waveforms, in which the rotor exciting currents Ifu, Ifv and Ifw are superposed at timings that have less influence on generating torque in the rotor.

In the present embodiment, the armature voltage (the second voltage V2) applied to each stator coil 32 becomes a sum of the synchronized voltage Vtu and the rotor exciting voltage Vfu. Accordingly, even when the synchronized voltage Vtu is superposedly added to the rotor exciting voltage Vfu, the inverter 70 can be controlled well at the second voltage V2.

In the present embodiment, the pulsed rotor exciting voltage Vfu is superposed on the synchronized voltage Vtu produced on the PWM voltage. Practically, the on- and off-periods of the PWM voltage that forms the synchronized voltage Vtu are converted, with the pulsed rotor exciting voltage Vfu superposed. This leads to a simplified and steady superposition of the rotor exciting voltages on the synchronized voltages, phase by phase. Incidentally the rotor exciting voltage Vfu also may be formed on PWM voltage.

In the present embodiment, the rotor exciting voltage Vfu is superposed in the vicinity of the zero-crossing point of the synchronized voltage Vtu. Thus, without increasing the voltage applied to the inverter 70, it is possible to superpose the rotor exciting voltage Vfu with larger amplitude.

In the present embodiment, the first voltage V1 from the battery 50 is boosted by the booster 60, providing a simple boosting construction. In addition, besides the battery 50, a high-voltage battery is not needed, suppressing parts costs. Further, the second voltage boosted up by the booster 60 is always applied to the inverter 70, whereby it is not necessary to have switching means to switch voltages applied to the inverter 70, resulting in a simplified configuration.

The configurations based on the first embodiment can still be developed into various other forms, which are listed below as modifications.

Modification 1-1

Figure 20:
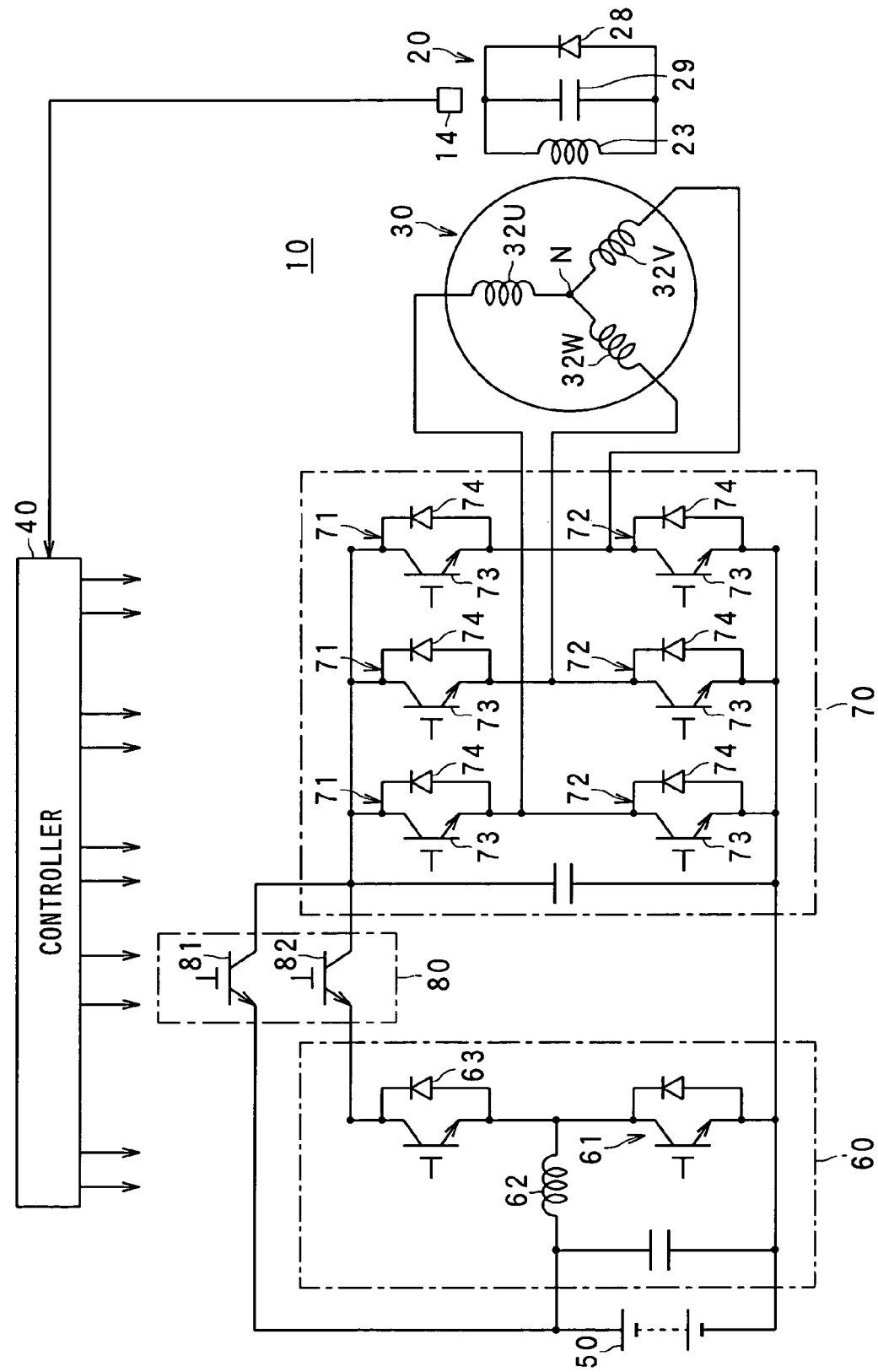
FIG. 20 is a circuit diagram showing components necessary for controlling a motor in a modification.

In the foregoing first embodiment, the first voltage from the battery 50 is boosted up to the second voltage V2 by the booster 60, and the second voltage V2 is used to drive the inverter 70. In this regard, there is provided another form. As shown in FIG. 20, an electrical switch 80 is provided so as to receive the output voltages from both the battery 50 and the booster 60. This switch 80 is subjected to switching operations to properly select the output from the battery 50 or the booster 60 in a controlled manner to drive the inverter 70. Specifically, the switch 80 includes first and second on/off electrical switches 81 and 82. When the first switch 81 is turned on and the second switch 82 is tuned off, it is possible to drive the inverter 70 at the first voltage V1 from the battery 50. In contrast, turning off the first switch 81 and turning on the second switch 82 makes it possible to drive the inverter 70 at the second voltage V2 outputted from the booster 60. When applying the rotor exciting voltage Vfu, the inverter 70 is driven at the second voltage V2.

Such a configuration allows the high-voltage rotor exciting voltage Vfu to be applied to the stator coil 32. Thus application of the shorter rotor exciting voltage Vfu enables the rotor exciting currents Ifu, Ifv and Ifw to flow, which currents are required for obtaining a desired amount of torque. Torque ripples caused in applying the rotor exciting voltage Vfu can also be suppressed. In addition, the synchronized voltages Vtu, Vtv and Vtw are given as optimum voltages to the motor 10, improving efficiency in power consumption in the entire system.

The booster 60 exemplified in the first embodiment and the above modification has been shown as an example, not limited to the explained and depicted one.

Modification 1-2

Figure 21:
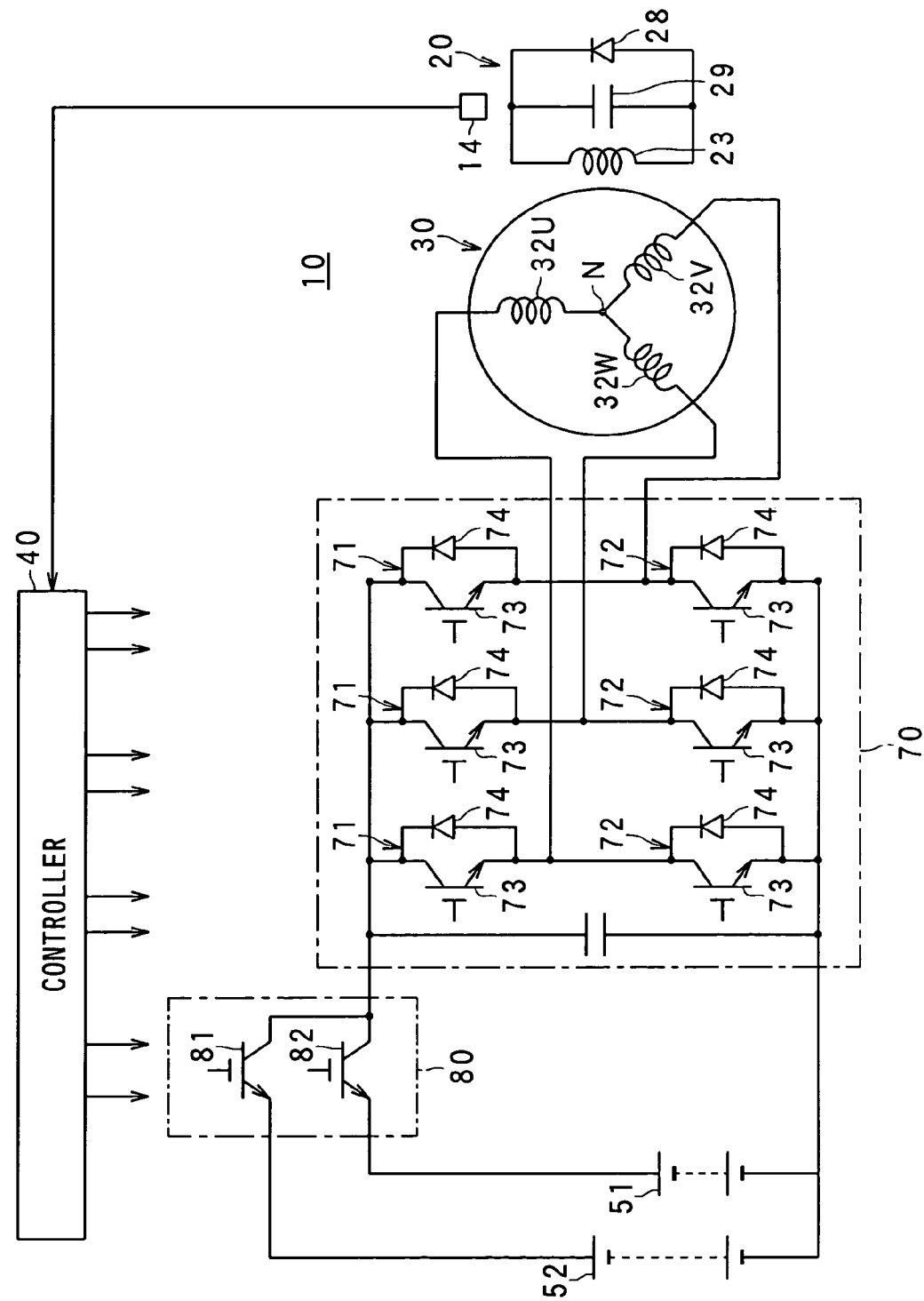
FIG. 21 is a circuit diagram showing components necessary for controlling a motor in another modification.

In the above modification, the switch 80 is used to perform the selective switching actions between the battery 50 or booster 60 and the inverter 70. However, this switching configuration may be modified into that shown in FIG. 21. Specifically, the battery 50 is replaced by a first DC power supply 51 whose rated value is set to the first voltage V1 and a second DC power supply 52 whose rated value is set to the second voltage V2 higher than the first voltage V1. The switch 80 is still arranged to selectively select and supply the outputs of the first and second DC power supplies 51 and 52 to drive the inverter 70. Thus the similar advantages to those in the foregoing modification can be gained.

Modification 1-3

Figure 22:
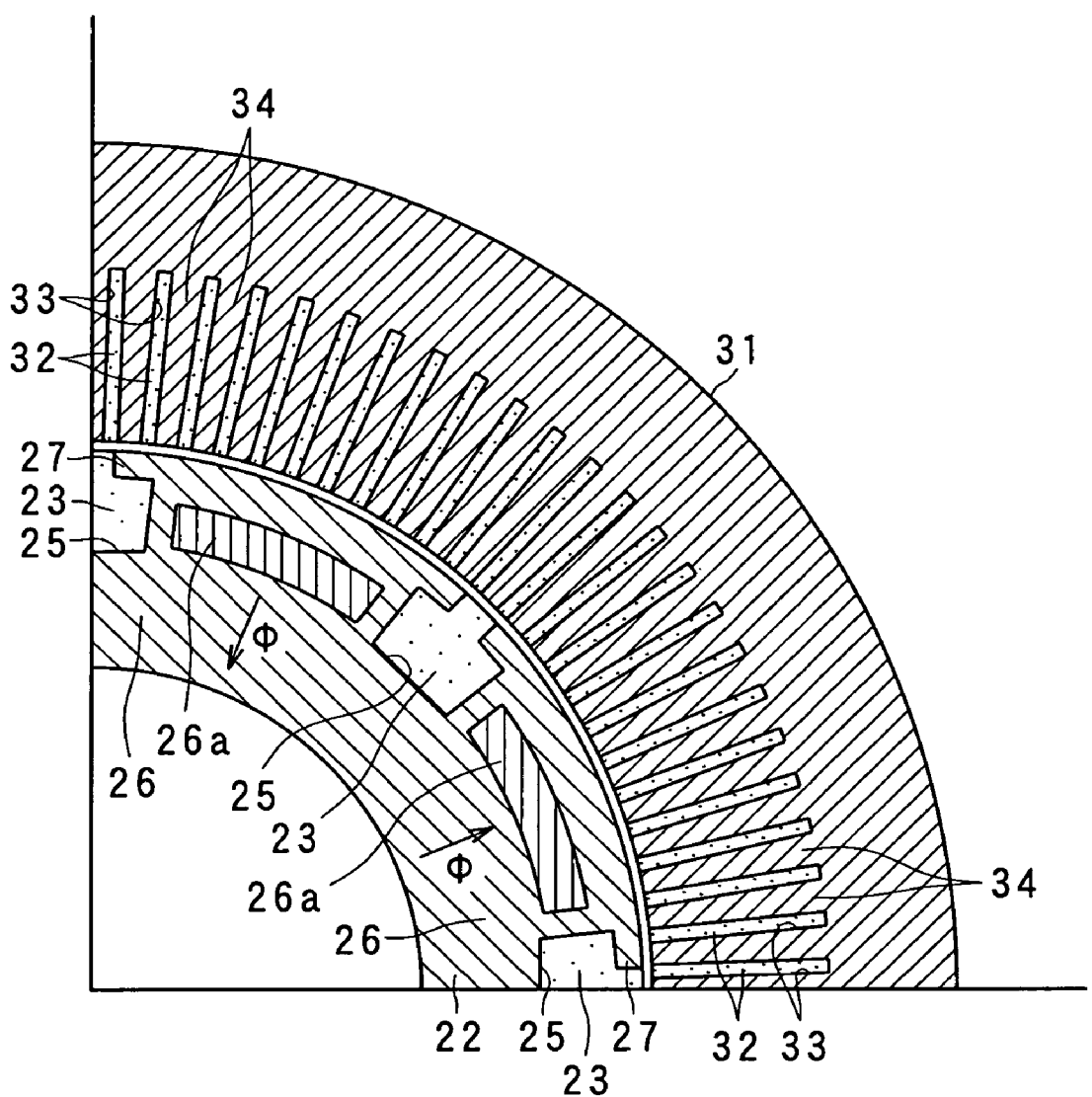
FIG. 22 is part of a radial sectional view showing a motor in another modification.

In the foregoing embodiment, the rotor-core tooth portions 26 have no magnet embedded therein. In this regard, a further modification can be provided as shown in FIG. 22, in which a magnet 26a is embedded in each of the rotor-core tooth portions 26. The magnets 26a assist excitation of the rotor 20. The present invention is still applied to a synchronous motor according to this modification.

Second Embodiment

Referring now to FIGS. 23-34, a "synchronous motor 10A" (, which is a field winding type of synchronous machine) according to a second embodiment of the present invention will be described.

In the second embodiment and subsequent embodiments and modifications, the components which are the same or identical as or to those in the first embodiment are given the same reference numerals for the sake of simplifying the description.

Figure 23:
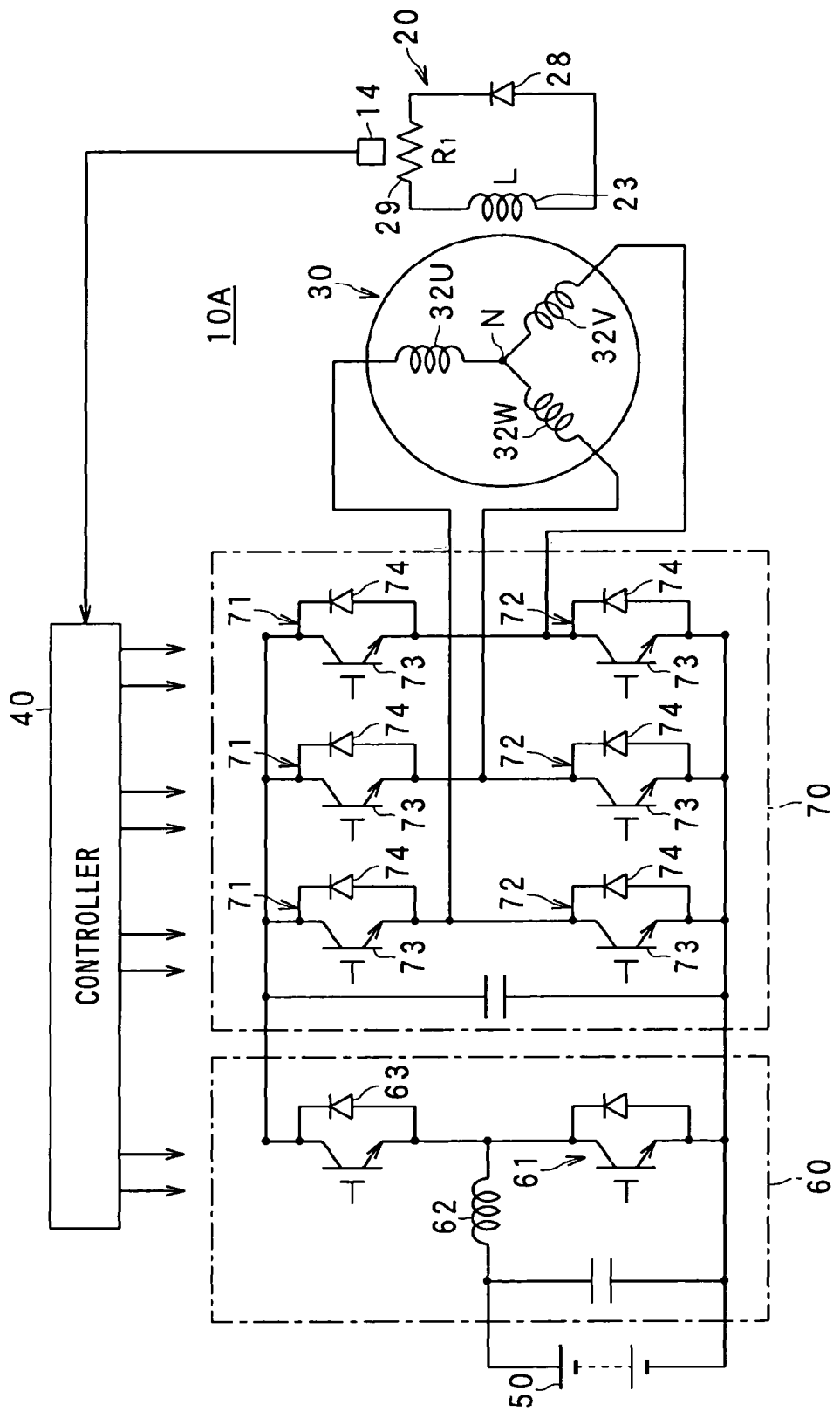
FIG. 23 is a circuit diagram showing components necessary for controlling the motor in a first embodiment according to the present invention.

FIG. 23 shows a circuit diagram of the motor 10A according to the second embodiment. As shown, the equivalent circuit of the rotor 20 is expressed in a different way from that in the first embodiment.

In the rotor 20, the rotor coil 23 has no electrical connection with the battery 50 and is short-circuited by the diode 28. The rotor coil 23 has an inductance L. Both the rotor coil 23 and the diode 28 have a resistance component which can be denoted by a resistor 29 which is different from those elements 23 and 28, the resistance of which resistor 29 is Rr. Like the operations in the first embodiment, the diode 28 rectifies AC currents induced and flowing through the rotor coil 23 in a half-wave rectification manner and excites the rotor-core tooth portions 26 arranged in the circumferential directions so that the portions 26 have N- and S-poles in turns for producing magnetic poles therein.

Figure 24:
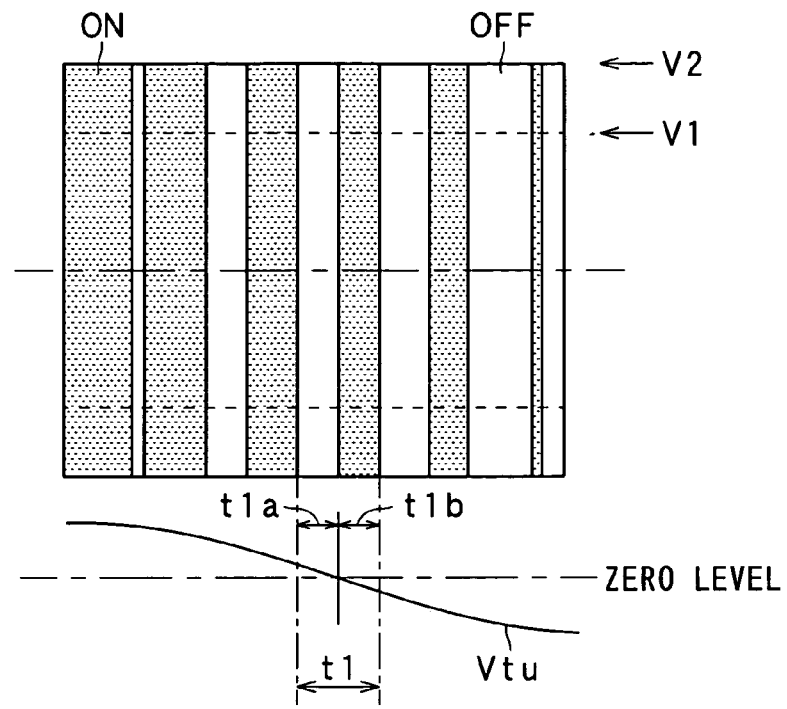
FIG. 24 illustrates the waveform a PWM phase voltage used to produce a one-phase synchronized current in the vicinity of zero-crossing point.
Figure 25:
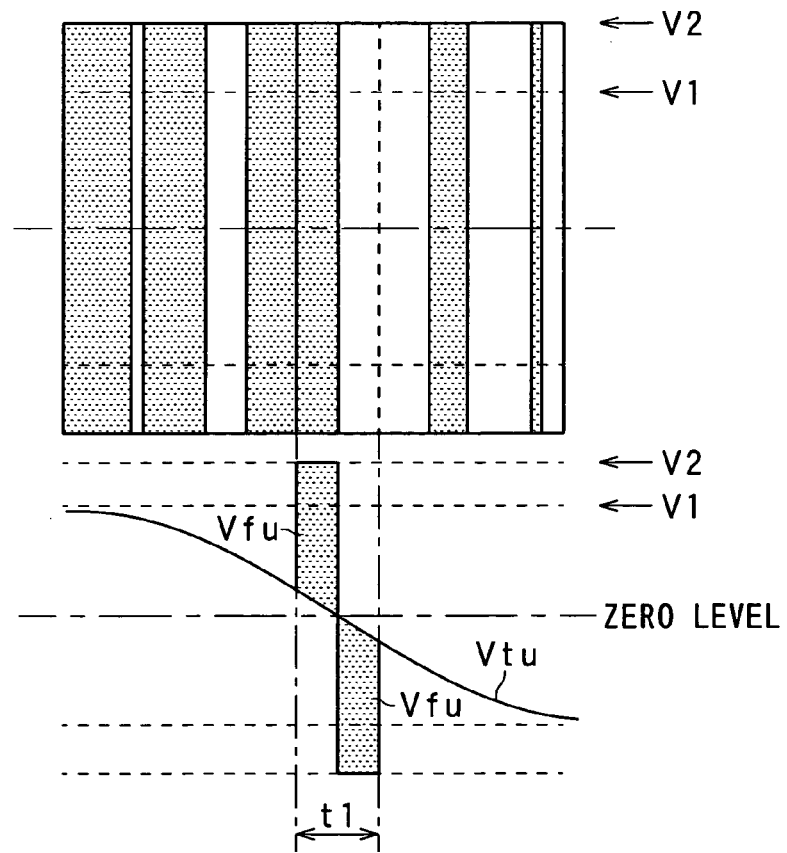
FIG. 25 illustrates the waveform the PWM phase voltage shown in FIG. 24, on which a rotor exciting voltage is superposed.

The descriptions made about FIGS. 4-9 in the first embodiment are also true of the present second embodiment, except for only use of the references numerals t1, t1a and t1b. As shown in FIGS. 24 and 25, the superposition (combination or superimposition) period for the rotor exciting voltage Vfu is given by t1, the phase period in which the synchronized voltage Vtu is positive is given by t1a, and the phase period in which the synchronized voltage Vtu is negative is given by t1b.

In the present embodiment, the rotor exciting currents Ifu, Ifv and Ifw are superpositioned only during the period t1, which is relatively shorter than the periods of the synchronized currents Itu, Itv and Itw.

The remaining configurations of the motor 10A are the same or similar to those described in the first embodiment.

The inventors simulated the operations of the motor 10A according to the second embodiment in various ways. The results are as follows.

(First Simulation)

In the first simulation, the inductance L, resistance Rr, and excitation period t0 were changed into three modes, which were summarized as three experiments 1 to 3.

In the experiments 1 to 3, one cycle (called "synchronization period t2") of each of the synchronized currents Itu, Itv and Itw was $1500 \times 10^{\wedge}(-6)$s. In the experiment 1, the value of Rr/L was set to 230 and the excitation period t0 was set to $750 \times 10^{\wedge}(-6)$s. That is, the excitation period t0 was shorter than the synchronization period t2. Moreover, the rotor exciting currents Ifu, Ifv and Ifw were superpositioned at predetermined phases of the synchronized currents Itu, Itv and Itw such that their angular periods for the superposition were set to be equal.

The second experiment 2 was the same as the first experiment 1 except for that the value of Rr/L was ¼ of that applied in the first experiment 1.

The third experiment 3 was the same as the first experiment 1 except for that the excitation period t0 was ⅓ of that applied in the first experiment 1.

Experiment 1

Figure 26:
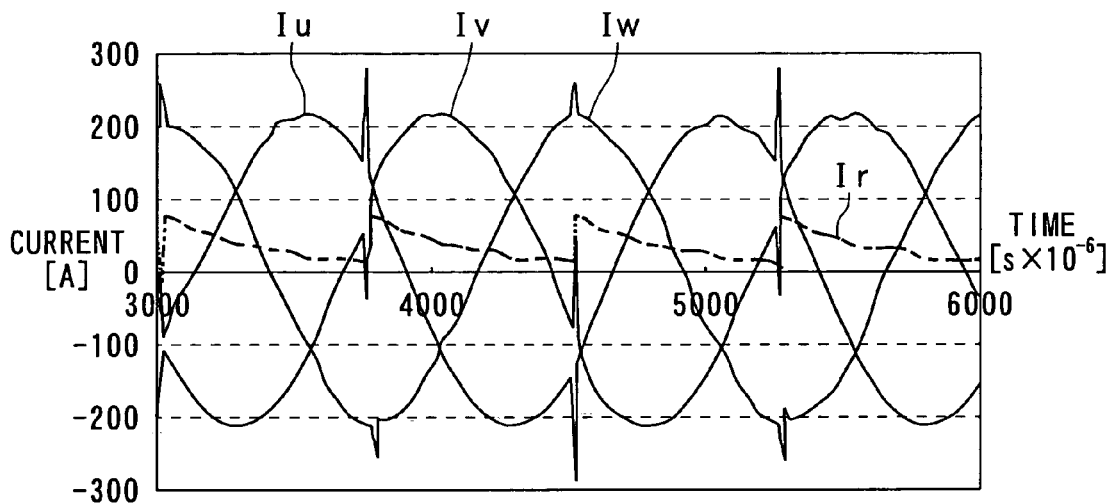
FIG. 26 shows the waveforms of respective phase currents and an exciting current caused through a rotor coil, which were tested as an experiment 1, which rotor exciting current is superposed on each phase synchronized current.
Figure 27:
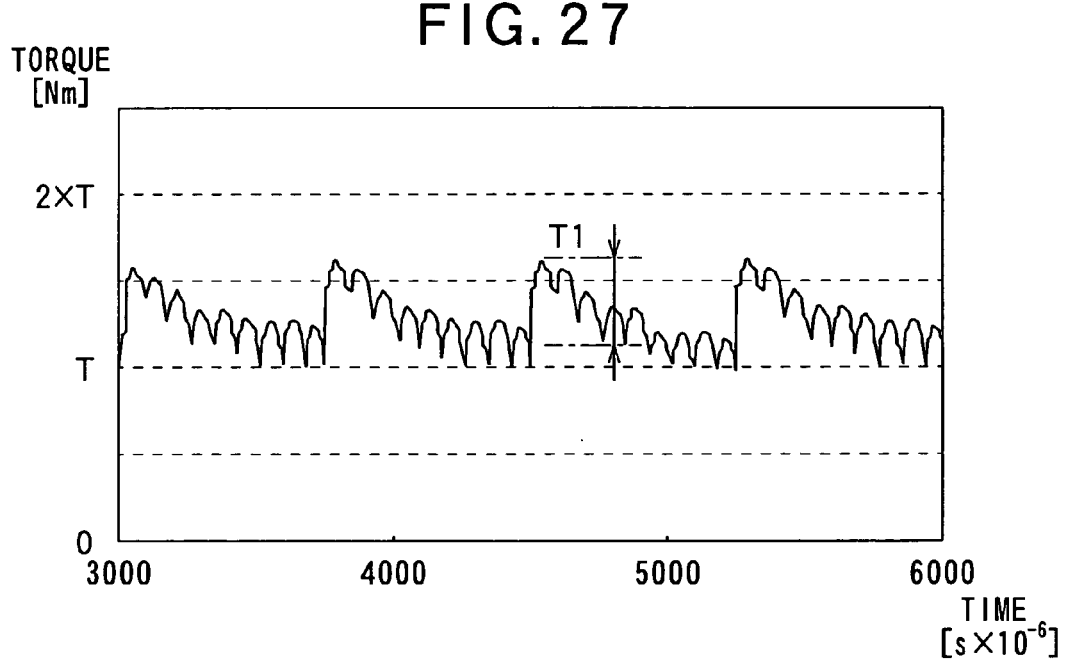
FIG. 27 shows the waveform of torque caused in the rotor in the experiment 1.

FIG. 26 shows the waveforms of both phase currents Iu, Iv and Iw (refer to solid lines) and an exciting current Ir (refer to a two-dot chain line) caused through the rotor coil 23, in which the phase currents Iu, Iv and Iw are produced by superimposing rotor exciting currents Ifu, Ifv and Ifw on the phase synchronized currents Itu, Itv and Itw. FIG. 27 shows the waveform of torque generated in the rotor 20.

It is understood from FIG. 26 that when the phase currents Iu, Iv and Iw, in which the pulsed rotor exciting currents Ifu, Ifv and Ifw are superpositioned on the synchronized currents Itu, Itv and Itw, respectively, are made to pass through the stator coils 32, the excitation current Ir flows through the rotor coil 23. It is also understood from FIG. 26 that the excitation current Ir changes at timings when the rotor exciting currents Ifu, Ifv and Ifw are superpositioned.

FIG. 27 shows ripples (fluctuations) in the generated torque (i.e., torque ripples), which is repeatedly at shorter periods and caused in the rotor 20. The rotor 20 rotates in response to a pulling force and a repulsion force provided by each of the salient poles in the stator core tooth portions 34. The torque ripples will be caused when each magnet pole produced in each rotor-core tooth portion 26 passes by the slot 33 and stator-core tooth portion 34 by turns.

Further, FIG. 27 reveals that there torque ripples are caused which are changed a lot more than the torque ripples caused when passing by the slot 33 and stator-core tooth portion 34 by turns. The torque generated in the rotor 20 depends on the exciting current Ir. Thus such larger torque ripples are generated in the rotor 20 in response to changes in the exciting current Ir.

From FIG. 26, it is understood that, as time passes, the exciting current Ir decays over a period from a timing when the rotor exciting currents Ifu, Ifv and Ifw are superpositioned to the next timing when the next currents Ifu, Ifv and Ifw are superpositioned. Solving a formula of $$L \cdot \frac{dIr}{dt} + Rr \cdot Ir = 0$$

gives the exciting current Ir a formula of $$Ir(t) = Iri \cdot e^{-\frac{Rr}{L}t}$$

where Iri denotes a value of the exciting current gained when the rotor exciting current is superpositioned. Hereinafter, this current Iri is called "exciting current in superposition."

Further, an "average exciting current Ira" over each period beginning from the superposition of one rotor exciting current to the superposition of the next one can be expressed as follows:

$$Ira = \frac{1}{t0}\int_0^{t0} Ir(t)dt = \frac{Iri \cdot L}{t0 \cdot Rr} \cdot \left(1 - e^{-\frac{Rr}{L}t0}\right), \quad (1)$$

where t0 denotes the excitation period.

In the experiment 1, as shown in FIG. 26, the exciting current in superposition, Irl, was 80 A and a value of the exciting current Ir which is shown a timing just before superimposing the rotor exciting current Ifu, Ifv and Ifw (hereinafter called "exciting current just before superposition, Ire") was about 16 A. The average exciting current Ira was about 35 A. In other words, both the exciting current just before superposition, Ire, and the average exciting current Ira were less than ½ of an "initial exciting current Iri." Since the exciting current Ir fluctuates largely when the rotor exciting currents Ifu, Ifv and Ifw are superpositioned, a torque ripple TR1 caused by the fluctuations in the exciting current Ir also becomes larger, as depicted in FIG. 27. Hence, in the case of the experiment 1, the vibration and noise from the motor 10A are forced to be larger, influencing largely practical use in some cases.

Experiment 2

Figure 28:
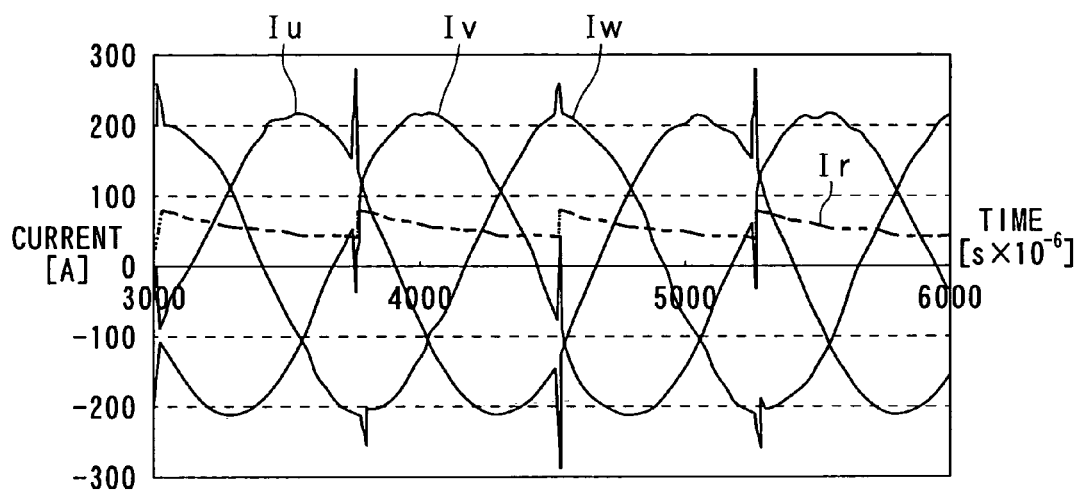
FIG. 28 shows the waveforms of respective phase currents and an exciting current caused through a rotor coil, which were tested as an experiment 2, which rotor exciting current is superposed on each phase synchronized current.
Figure 29:
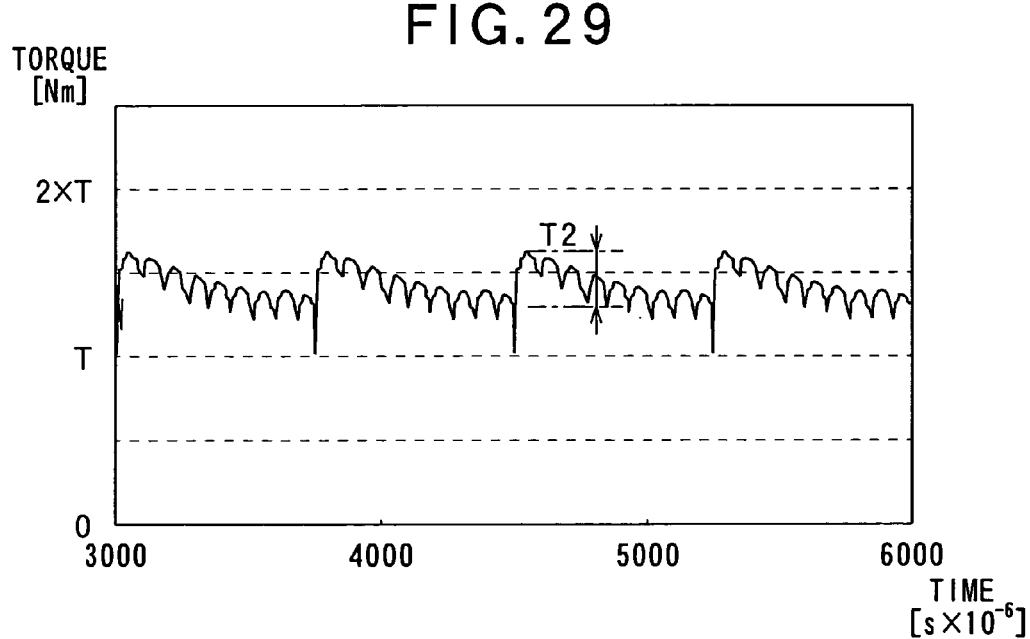
FIG. 29 shows the waveform of torque caused in the rotor in the experiment 2.

FIG. 28 shows the waveforms of both phase currents Iu, Iv and Iw (refer to solid lines) and an exciting current Ir (refer to a two-dot chain line) caused through the rotor coil 23, in which the phase currents Iu, Iv and Iw are produced by superimposing rotor exciting currents Ifu, Ifv and Ifw on the phase synchronized currents Itu, Itv and Itw. FIG. 29 shows the waveform of torque generated in the rotor 20.

It is understood from FIG. 28 that when the phase currents Iu, Iv and Iw, in which the pulsed rotor exciting currents Ifu, Ifv and Ifw are superpositioned on the synchronized currents Itu, Itv and Itw, respectively, are made to pass through the stator coils 32, the excitation current Ir flows through the rotor coil 23. It is also understood from FIG. 28 that the excitation current Ir changes at timings when the rotor exciting currents Ifu, Ifv and Ifw are superpositioned. However the exciting current Ir decays at a less steeper inclination, because the value of Rr/L was set to ¼ of that in the experiment 1.

Practically, as shown in FIG. 28, the experiment 2 showed that the exciting current in superposition, Iri, was about 80 A and the exciting current just before superposition, Ire, was about 42 A. The average exciting current Ira was about 54 A. That is, both the exciting current just before superposition, Ire, and the average exciting current Ira were more than ½ of the initial exciting current Iri.

The exciting current Ir is set such that it decays at a less inclination, with the result that the torque is suppressed from decreasing largely, as shown in FIG. 29. As a result, the experiment 2 showed an improvement of some 10% in the average torque in comparison with that in the first experiment 1. In addition, the fluctuations in the exciting current Ir observed in superimposing the rotor exciting currents Ifu, Ifv and Ifw become smaller. Hence, as shown in FIG. 29, a torque ripple TR2 due to changes in the exciting current Ir was also smaller, compared to that in the first experiment 1.

Therefore, it is found that, as in the present experiment 2, setting the values of Rr and L to proper values to increase both the currents Ire and Ira more than ½ of the initial exciting current Iri suppresses the torque ripple, lowering the vibration and noise from the motor 10A to practically allowable levels.

In summary, when the values of Rr and L are decided to satisfy i) a first formula of $$e^{-\frac{Rr}{L}t0} \geq \frac{1}{2} \quad (2)$$

, which is defined based on the condition that the exciting current just before superposition, Ire, (=Ir(t0)) is more than ½ of the exciting current in superposition, Iri, or ii) a second formula of $$\left(1 - \frac{Rr \cdot t0}{2L}\right) - e^{-\frac{Rr}{L}} \geq 0 \quad (3)$$

, which is defined based on the condition that the average exciting current Ira is more than ½ of the initial exciting current Iri, the torque ripple can be suppressed down to practically allowable levels.

Experiment 3

Figure 30:
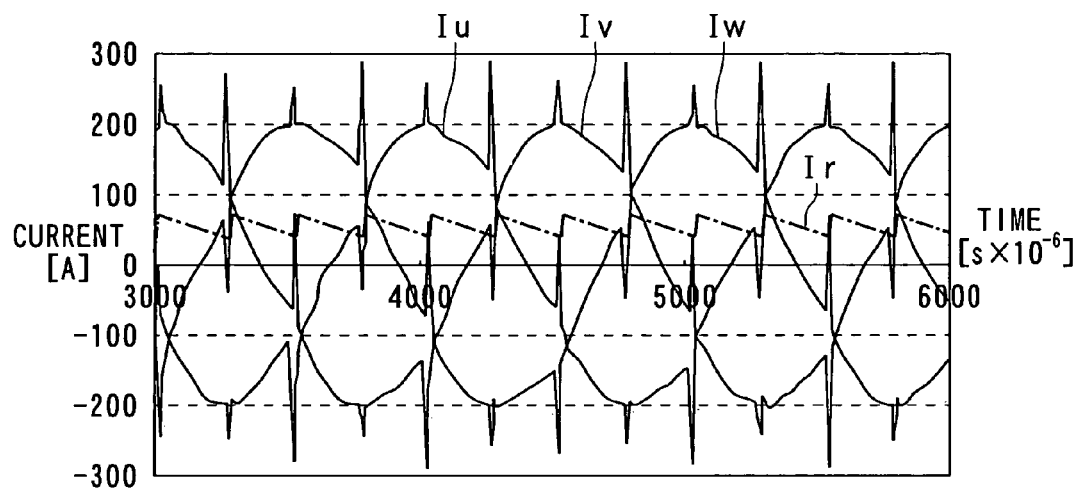
FIG. 30 shows the waveforms of respective phase currents and an exciting current caused through a rotor coil, which were tested as an experiment 3, which rotor exciting current is superposed on each phase synchronized current.
Figure 31:
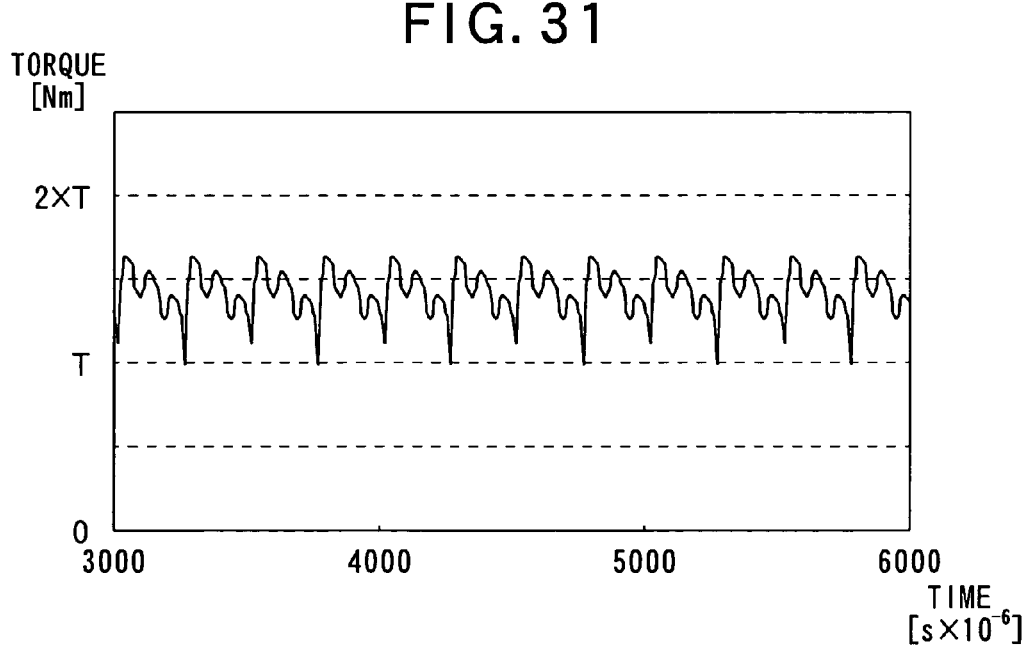
FIG. 31 shows the waveform of torque caused in the rotor in the experiment 3.

FIG. 30 shows the waveforms of both phase currents Iu, Iv and Iw (refer to solid lines) and an exciting current Ir (refer to a two-dot chain line) caused through the rotor coil 23, in which the phase currents Iu, Iv and Iw are produced by superposing rotor exciting currents Ifu, Ifv and Ifw on the phase synchronized currents Itu, Itv and Itw. FIG. 31 shows the waveform of torque generated in the rotor 20.

It is understood from FIG. 30 that when the phase currents Iu, Iv and Iw, in which the pulsed rotor exciting currents Ifu, Ifv and Ifw are superpositioned on the synchronized currents Itu, Itv and Itw, respectively, are made to pass through the stator coils 32, the excitation current Ir flows through the rotor coil 23. It is also understood from FIG. 30 that the excitation current Ir changes at timings when the rotor exciting currents Ifu, Ifv and Ifw are superpositioned. However, in the third experiment 3, the excitation period t0 was set to ⅓ of that in the first experiment 1. Thus, though the exiting current Ir decays in the same degree as that in the first experiment 1, the rotor exciting currents Ifu, Ifv and Ifw are superpositioned again before the exciting current Ir decays largely. This resuperposition allows the exciting current Ir to return to its exciting current in superposition, Iri, before being reduced largely.

Practically, as shown in FIG. 30, the exciting current in superimposition, Iri, was about 80 A, and the exciting current just before superimposition, Ire, was about 45 A. The average exciting current Ira was about 55 A. In other words, both the currents Ire and Ira are more than ½ of the initial exciting current Iri. The return of the exciting current Ir to its exciting current in superimposition, Iri, prior to its larger reduction makes it possible to suppress a reduction in the torque. As a result, as to the average torque, the experiment 3 showed an improvement of approx. 15%, compared to the experiment 1.

In addition, the fluctuations in the exciting current Ir in superposing the rotor exciting currents Ifu, Ifv and Ifw were made smaller. Thus, as depicted in FIG. 31, the torque ripples owing to the fluctuations in the exciting current Ir were made much smaller, which is comparable with shorter-period torque ripples caused by the magnetic poles of the rotor-core tooth portions 26 which pass by the slot 33 and the stator-core tooth portions 34 by turn.

Therefore, it is found that, as in the present experiment 3, setting the excitation period t0 to a proper value to increase both the currents Ire and Ira more than ½ of the initial exciting current Iri suppresses the torque ripple, lowering the vibration and noise from the motor 10A to practically allowable levels.

That is, when it is decided to use the excitation period t0 to satisfy the formulae (2) and (3), the torque ripples can be suppressed down to practically allowable levels.

(Second Simulation)

In the second simulation, the inductance L and resistance Rr were fixed at their predetermined values, respectively. The rotational speed of the rotor 20 was changed to 1000, 2000 and 3000 rpm, and at each speed, an average exciting current Ira and an average excitation power P were measured with changing the number of pulses, n, of each of the rotor exciting currents Ifu, Ifv and Ifw per period (called "synchronization period t2") of each of the synchronized currents Itu, Itv and Itw. Hereinafter, the number of pulses, n, is called "the number of pulses, n, per synchronization period t2."

Figure 32:
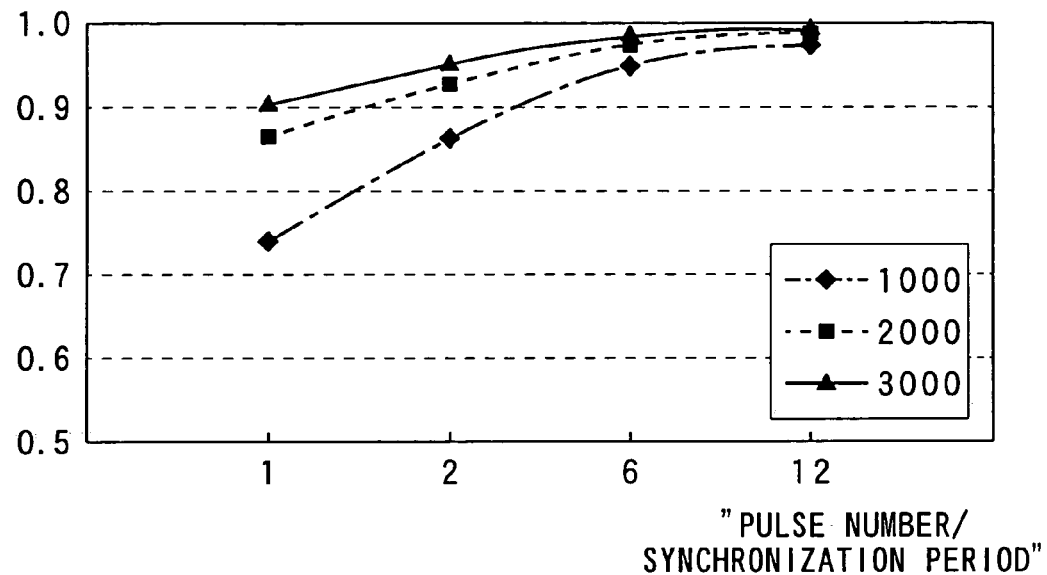
FIG. 32 shows various values average exciting current obtained when the number of pulses per synchronization period is changed.

FIG. 32 shows the average exciting current Ira obtained when "the number of pulses, n, per synchronization period t2" was changed. In the figure, a solid line, a broken line, and a dashed-one dotted line depict the current Ira obtained when the rotational speed of the rotor 20 is 3000, 2000, and 1000 rpm, respectively. This notation is true of the graphs shown in FIGS. 33 and 34.

The average exciting current Ira can be expressed by the formula (1), so that it is understood that the shorter the excitation period t0, the greater the average exciting current Ira. The excitation period t0, the synchronization period t2 and the number of pulses, n, per synchronization period t2 can be connected with each other by a formula of $$t0 = t2/n.$$

With an increase in the rotational speed of the rotor 20, the synchronization period t2 becomes shorter, whereby the excitation period t0 becomes shorter as well. Therefore, as shown in FIG. 32, in cases where the number of pulses, n, per synchronization period t2 is fixed at a value, the average exciting current Ira becomes larger with an increase in the rotational speed of the rotor 20. Further, when the rotational speed of the rotor 20 is the same, that is, the synchronization period t2 is the same, the excitation period t0 decreases, as the number of pulses, n, per synchronization period t2 increases, whereby the average exciting current Ira becomes larger.

FIG. 32 shows that, if the average exciting current Ira to be required is 0.9×I A, 1000 rpm needs 6 pulses, 2000 rpm needs 2 pulses, and 3000 rpm needs 1 pulse. These pulses are able to suppress power consumption and meet the required average exciting current Ira to be required.

Figure 33:
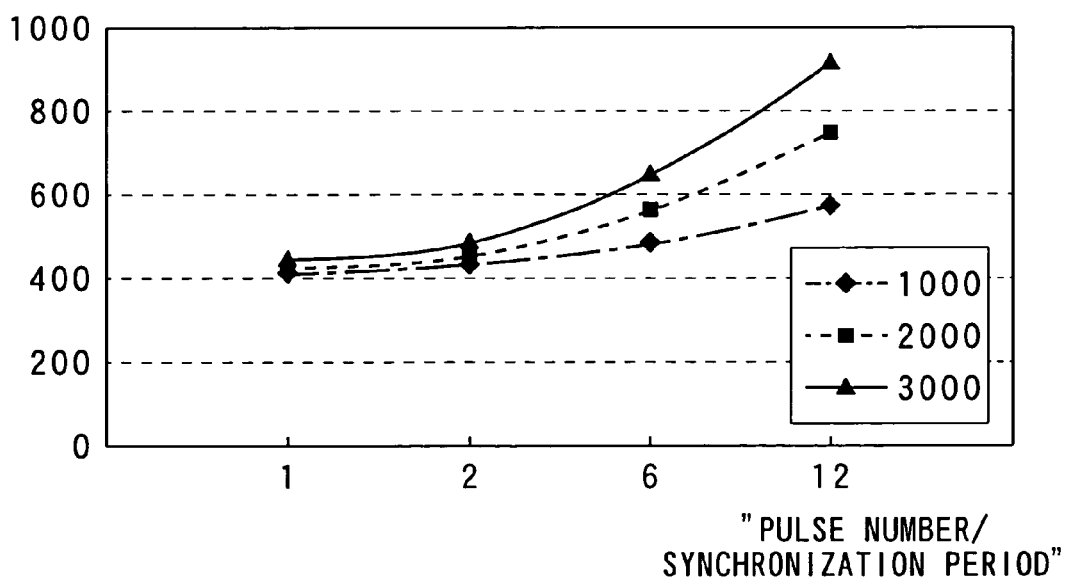
FIG. 33 shows various values of average exciting power obtained when the number of pulses per synchronization period is changed.

FIG. 33 shows the average excitation power P obtained when the number of pulses, n, per synchronization period t2 was changed. An average excitation power P required for superposing n-pieces pulses per synchronization period t2, that is, an average excitation power P consumed by the stator 30 and rotor 20 during superposition of the pulses, can be expressed by the following formula.

$$P = 3 \cdot Is^2 \cdot Rs \cdot t1/t0 + Ira^2 \cdot Rr$$
$$= 3 \cdot Is^2 \cdot Rs \cdot (t1 \cdot n/t2) + Ira^2 \cdot Rr$$

, where Is denotes stator current, Rs denotes the resistance of the stator coil, Ira denotes the average exciting current Ira, t0 denotes the excitation period, and t1 denotes the duration of application of pulses.

FIG. 33 shows a relationship on the above formula. As understood from FIG. 33, it is found that there is a tendency that the average excitation power P increases as "the number of pulses, n, per synchronization period t2" increases.

Figure 34:
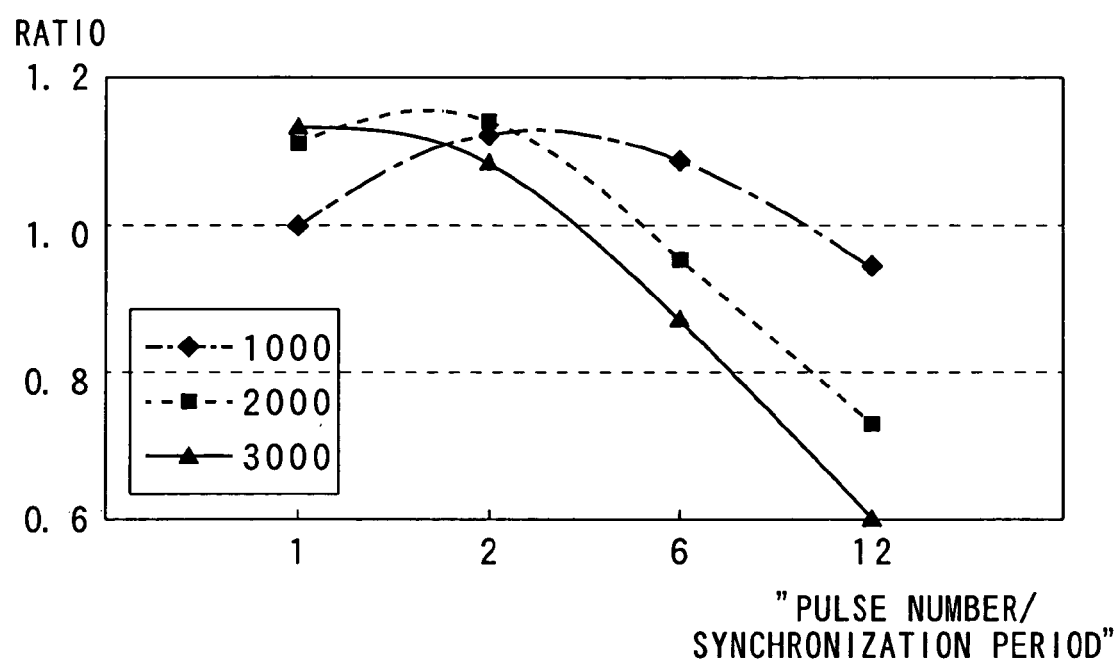
FIG. 34 shows various values of average exciting current and average exciting power both obtained when the number of pulses per synchronization period is changed.

FIG. 34 is provided using a ratio "Ira/P" between the average exciting current Ira and the average excitation power P. From a quantitative viewpoint, this ratio "Ira/P" can be expressed by the following formula.

$$\frac{Ira}{P} = \frac{Iri \cdot L}{t0 \cdot Rr}\left(1 - e^{-\frac{Rr}{L}t0}\right) \bigg/ (3 \cdot Is^2 \cdot Rs \cdot (t1 \cdot n/t2) + Ira^2 \cdot Rr) \quad (4)$$
$$= \frac{Iri \cdot L \cdot Rr \cdot t0 \cdot \left(1 - e^{-\frac{Rr}{L}t0}\right)}{3 \cdot Is^2 \cdot Rs \cdot t0^2 \cdot t1 \cdot Rr^2 + Iri^2 \cdot L^2 \cdot Rr \cdot \left(1 - e^{-\frac{Rt}{L}t0}\right)^2}$$
$$= \frac{Iri \cdot L \cdot Rr \cdot t2 \cdot \left(1 - e^{-\frac{Rrt2}{Ln}}\right)}{3 \cdot Is^2 \cdot Rs \cdot t1^2 \cdot t2^2/n \cdot Rr^2 + Irl^2 \cdot L^2 \cdot Rr \cdot n \cdot \left(1 - e^{-\frac{Rt \cdot t2}{Ln}}\right)^2}$$

FIG. 34 shows that each of the curves on the ratio "Ira/P" has a local maximal value. By setting "the number of pulses, n, per synchronization period t2" such that the ratio "Ira/P" has a local maximal value, the exciting current Ir can be generated with efficiency. In other words, when the excitation period t0 is decided to allow the ratio "Ira/P" to have a local maximal value, the torque can be generated with efficiency. For example, when the excitation period t0 is decided such that 4 pulses are for 1000 rpm, 2 pulses are for 2000 rpm, and 1 pulse is for 3000 rpm, the average exciting current Ira per average excitation power P becomes maximum, generating the torque efficiently.

Therefore, the motor 10A according to the present embodiment provides the following advantageous functions.

In the present embodiment, either the "exciting current in superposition, Iri" or the "average exciting current Ira" is less than ½ of the "initial exciting current Iri." This makes it possible that fluctuations in the exciting current Ir and fluctuations in the torque of the rotor 20, both fluctuations of which are caused at timings when the rotor exciting currents Ifu, Ifv and Ifw are superposed. As a result, the noise and vibration from the motor 10A, which are caused at those superposition timings, can be reduced. Practically, either the ratio between the resistance Rr and inductance L of the rotor coil 23 or the excitation period t0 is determined to be a proper value to satisfy the formula (2) or (3). Thanks to this determination, the exciting current Ir is suppressed from decaying heavily or rapidly, reducing the torque ripples.

In the present embodiment, the excitation period t0 is set to allow the ratio "Ira/P" to have a local maximal value. To be specific, the excitation period t0 is decided to meet the formula (4), which leads to an efficient generation of the torque in the rotor 20.

In the present embodiment, the excitation period t0 is shorter than the synchronization period t2. This means that the rotor exciting currents Ifu, Ifv and Ifw are superposed at least one time during each synchronization period t2. Thus it is avoidable that no superposition of the rotor exciting currents Ifu, Ifv and Ifw is made during a long time in a state where the rotor 20 rotates at lower speeds.

In the present embodiment, the rotor exiting currents Ifu, Ifv and Ifw are superposed at the predetermined phases of the synchronized currents Itu, Itv and Itw. This superposition gives an improvement to the waveforms of the respective phase currents Iu, Iv and Iw. For example, the rotor exciting currents Ifu, Ifv and Ifw can be superposed at timings which have less influence on generation of the torque in the rotor 20, improving the current waveforms.

In the present embodiment, each of the rotor exciting currents Ifu, Ifv and Ifw is superposed at regular angular intervals, which equalizes an amount of decay of the exciting current Ir. Thus the torque ripples are also equalized, so that the noise and vibration from the motor 10A are prevented or suppressed from being larger at specific timings.

MODIFICATIONS

Various modifications of the second embodiments are provided as follows.

Modifications 2-1

In this modification, both the ratio between the resistance Rr and the inductance L of the rotor coil 23 and the excitation period t0 are set to their proper values, instead of setting either the ratio between the resistance Rr and the inductance L or the excitation period t0 to its proper value, as described in the simulation 1. The setting technique in this modification is also allowed to utilize the decay of the exciting current Ir to suppress the torque ripples.

Modifications 2-2

This modification relates to selection of parameters for generating the torque with efficiency.

In the simulation 2, the excitation period t0 is set to a proper value to make the average exciting current Ira per average excitation power P have a local maximal value, with the torque generated efficiently. In place of this setting, the resistance Rr or the inductance L may be set to its proper value to make the average exciting current Ira per average excitation power P have a local maximal value, generating the torque efficiently. That is, at least one of the excitation period t0, resistance R, or inductance L may be set to its proper value such that the average exciting current Ira per average excitation power P has a local maximal value.

Modifications 2-3

In this modification, setting is made so as to not only meet at least one of the formulae (2) and (3) but also allow at least one of the excitation period t0, resistance Rr, and inductance L to have a local maximal value. This is also effective for generating the torque efficiently, while still suppressing the torque ripples.

Modifications 2-4

In the second embodiment, the excitation period t0 of each of the rotor exciting currents Ifu, Ifv and Ifw is set to be shorter than the synchronization period t2 of each of the synchronized currents Itu, Itv and Itw. But this is not a decisive list. When the rotor 20 rotates at greater speeds, the synchronization period t2 becomes smaller. Thus, even if the exciting period t0 is decided to be longer than the synchronization period t2, the absolute value of the synchronization period t0 may not be excessively larger in some speed conditions. Accordingly, at some rotational speeds of the rotor 20, the excitation period t0 may be set to be longer than the synchronization period t2.

In addition, the rotor exciting currents Ifu, Ifv and Ifw may be superposed at phases and at angular intervals, which are other than the predetermined phase and the regular angular intervals stated in the second embodiment.

Modifications 2-5

In the second embodiment, magnets are not embedded in the rotor-core tooth portions 26, but as already stated, the magnets may be embedded in the portions 26 (refer to FIG. 22).

Third Embodiment

Referring now to FIGS. 35-41, a field-winding type of synchronous machine with armature windings being powered, which is based on the present invention, will now be described.

In the third embodiment, the field-winding type of synchronous machine is reduced into practice as an on-vehicle "generator motor." The vehicle on which the generator motor is mounted is for example a hybrid electric vehicle with a battery and an engine both serving as drive sources, an electric vehicle with a battery serving as a drive source, and a fuel-cell electric vehicle.

Figure 36:
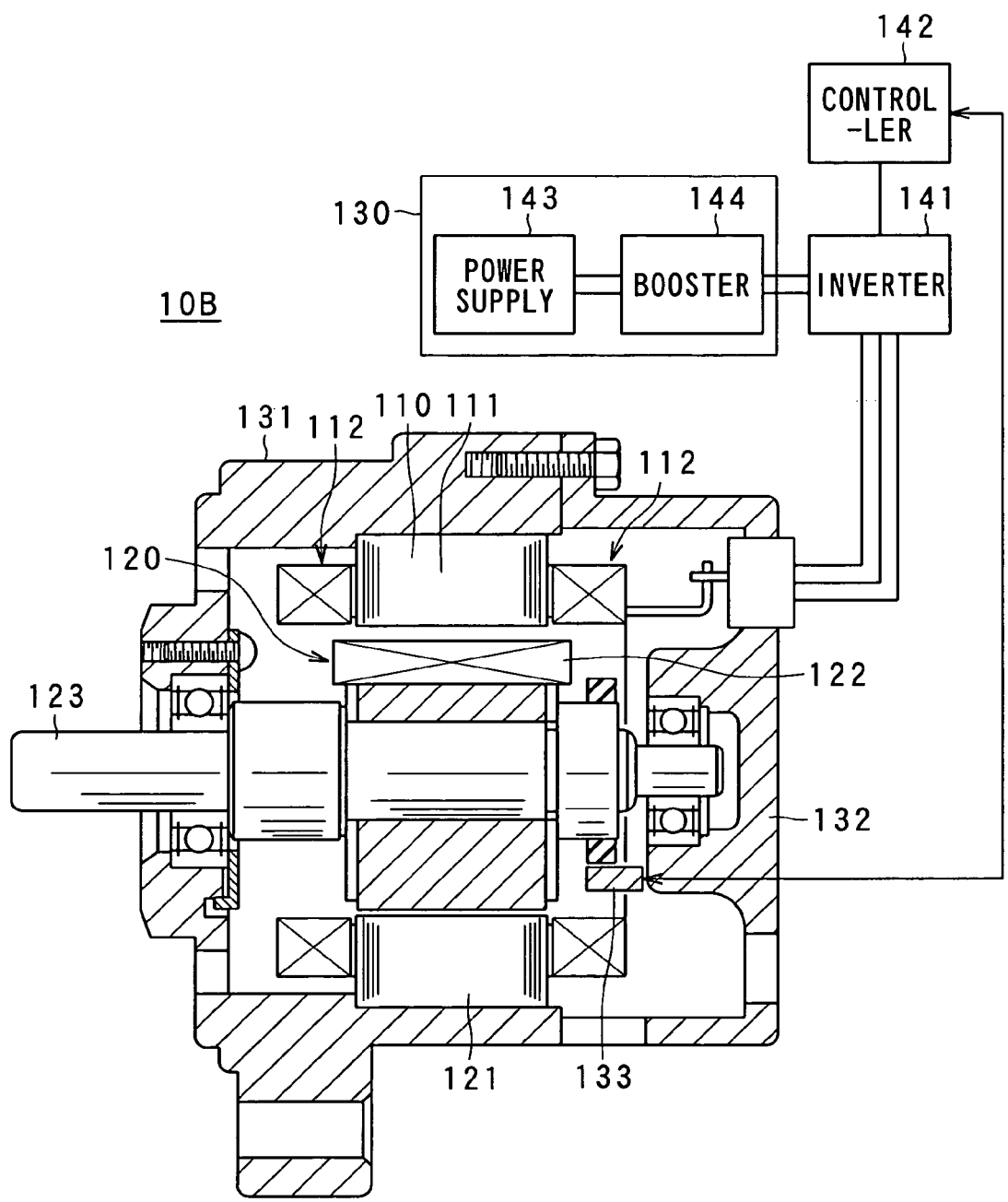
FIG. 36 is a schematic diagram showing a generator motor apparatus including the motor generator of the third embodiment.

FIG. 36 shows a section of the generator motor 10B according to the present embodiment. The generator motor is provided with a stator 110 with a stator core 111, stator coils (i.e., stator windings) 112 wound in the stator core 111, a rotor 120 with a rotor core 121, a rotor coil (i.e., field winding) 122 wound in the rotor core 121, a rotor shaft 123, frames 131 and 132, and a position sensor 133.

The stator 110 is secured to the frames 131 and 132 to be contained by a housing composed of the frames 131 and 132. The rotor 120 is rotatably supported in the frames 131 and 132. The poison sensor 133 is located to face the outer circumferential surface of a magnetic ring plate secured on the rotor shaft 123. In the magnetic ring plate, there are arranged magnetic salient poles at regular pitches in a circumferential direction of the plate. The position sensor 133 detects rotational positions of the rotor 120 by magnetically sensing the passage of the magnetic salient poles and outputs an electrical signal indicting the detected rotational position.

The rotor motor 10B is driven by an inverter 141, a controller 142, and a DC power supply composed of a power supply 143 and a booster 144. The inverter 141 receives electric signals from the position sensor 133 and the controller 142 to apply to the stator coils a voltage boosted by the booster 144. The stator coils 112 are three-phase windings. The inverter 141 controls the voltage applied to those three-phase windings so that the windings generate desired rotational magnetic fields.

Figure 35:
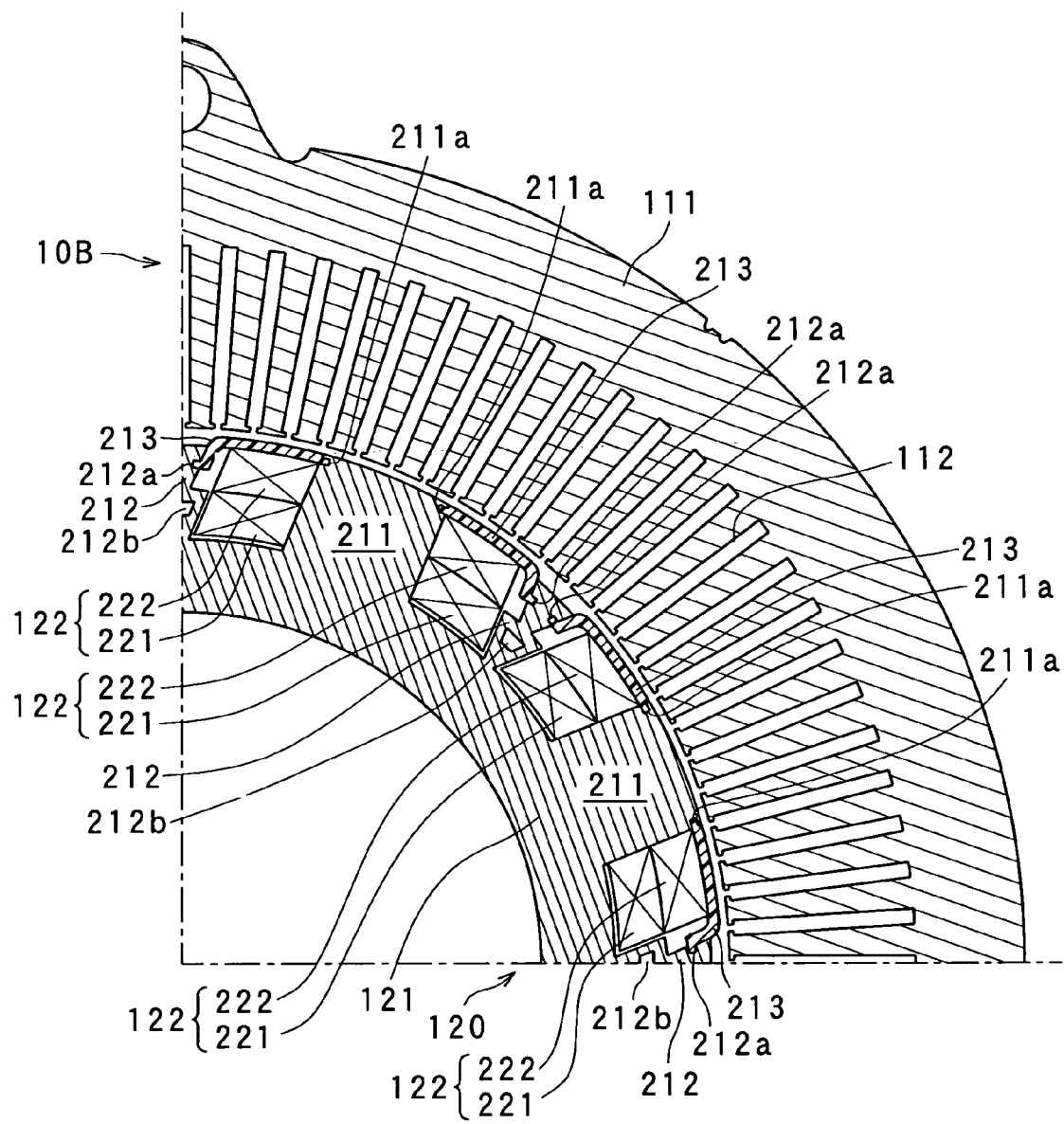
FIG. 35 is a partial sectional view, taken along a plane perpendicular to the axial direction of a generator motor according to a third embodiment of the present invention.
Figure 37:
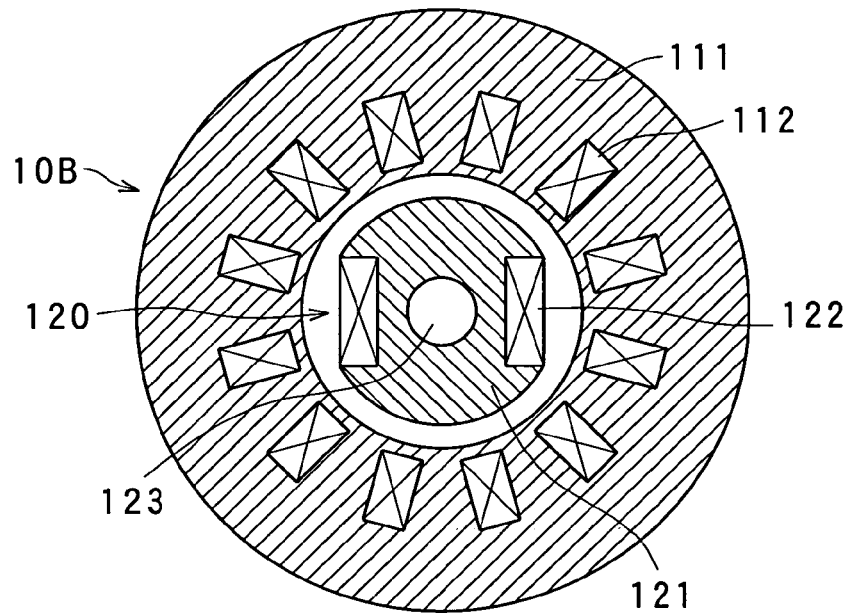
FIG. 37 is a sectional view outlining a section along a plane perpendicular to the axial direction.

FIG. 37 shows a radial sectional view of the stator 110 and rotor 120 taken along perpendicularly to the axial direction of the shaft 123. A detail of FIG. 37 is shown in FIG. 35. The controller 142 controls the inverter 141 to intermittently supply armature currents to the stator coils 112 in a manner that the armature currents correspond to a rotational position of the rotor 120 detected by the position sensor 133. As shown in FIG. 35, the rotor core 121 has a plurality of pairs of core tooth portions 211 (serving as magnetic salient poles), in which each pair composes a pair of magnetic poles. The rotor coil 122 is wound in a square form to surround the core tooth portions 211 so that a field magnetic field is produced in each core tooth portion 211.

Figure 38:
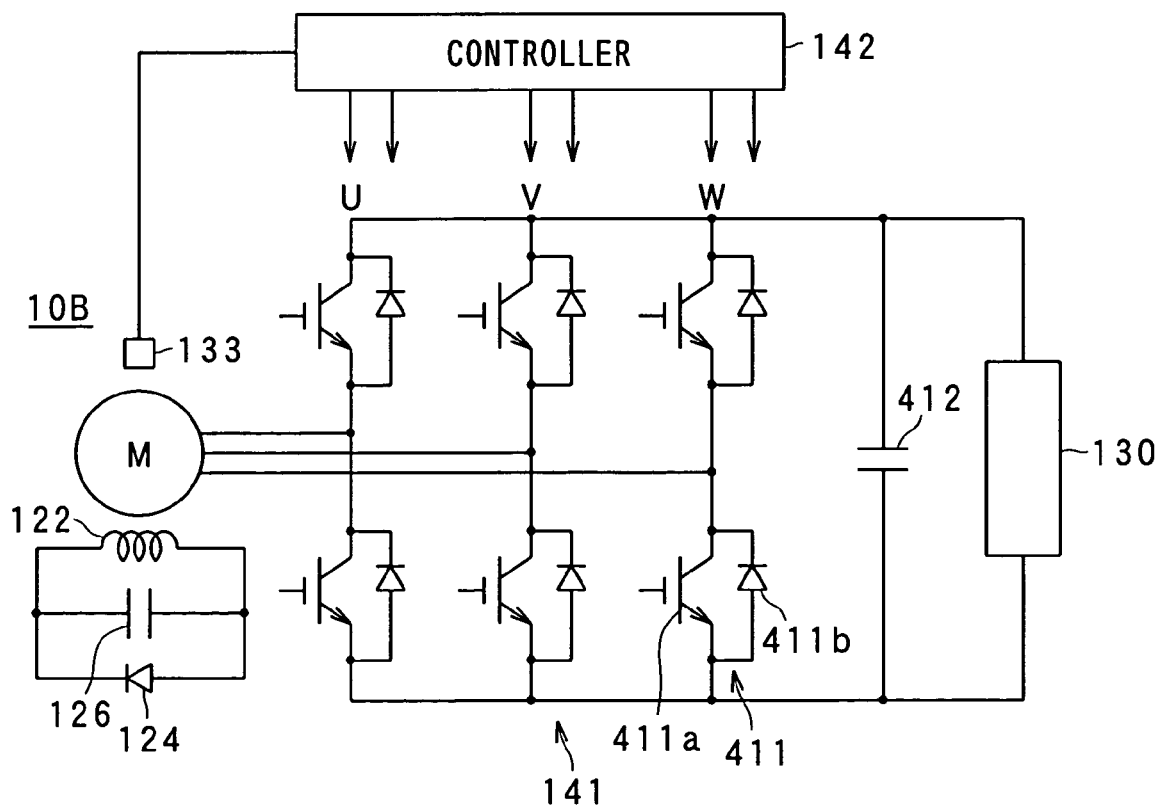
FIG. 38 is an electric circuit diagram of the motor generator apparatus.

FIG. 38 shows an electric circuit for the motor generator 10B. The inverter 141 is a three-phase inverter in which there are three upper elements 411, three lower arm elements 411. Each arm 411 is composed of an electrical switching element 411a such as IGBT and a flywheel diode 411b. An AC voltage induced through the rotor coil 122 is subjected to half-wave rectification at the diode 124 so that, of a pair of core tooth portions 211, one portion is magnetically excited into N-pole and the other is magnetically excited into S-pole. A smoothing capacitor 126 is arranged to smooth the rectified voltages so that ripples are reduced. In the circuitry shown in FIG. 38, another smoothing capacitor 412 is arranged to smooth AC voltages from the power supply 130.

The inverter 141 operates to supply the stator coils 112 with particular AC currents (called rotor exciting currents) in order to induce the AC currents through the rotor coils 122. As a result, the armature current flowing through each of the stator coils 112 is a sum of a synchronized current which is a current to generate toque in the rotor 120 and the rotor exciting current.

Compared to the frequency (fundamental frequency) of the synchronized currents, the frequency of the rotor exciting current is higher. The rotor exciting current is made as a pulsed current. Supplying this rotor exciting current to each of the stator coils 112 produces an AC magnetic field, which interlinks with the rotor coil 122 to make the rotor coil generate AC current therethrough. The rotor coil 122 is short-circuited by the diode 124, so only one way current flows through the rotor core 122. Thus the rotor core 121 is subjected to magnetic excitation in a predetermined direction, so that a single pair of field poles is produced in the rotor core 121. That is, the field flux is produced depending on supplying the rotor exciting current to the stator core 112 and rectifying the induced AC current through the rotor coil 122.

Referring to FIG. 35, the rotor 120, which is an essential part of the present embodiment, will now be detailed.

In the rotor 120, the rotor core 121 has a cylindrical from with an outer circumference on which the core tooth portions 211 are formed, by a plurality of piece, to protrude therefrom in the radial direction. The protruded outer end face of each core tooth portion 211 is positioned to face the inner tooth end face of the stator core 111. A magnetic circuit is produced to path a gap between the end faces of each core tooth portion 211 and the stator core 111. To interlink with the magnetic flux passing the gap, the rotor coil 122 is wound in the square form around each core tooth portion 211.

Between the adjacent rotor-core tooth portions 211, two wound coil segments of the rotor coil 122 should encounter with each other and stay there. Between those two coil segments, there is formed an intermediate area in which a protrusion 212 (serving as a connecting member) is formed to protrude in the radial direction from the outer circumference of the rotor core 121. The protrusion 212, each rotor-core tooth portion 211 and the rotor core 121 are produced as an integral member made by laminating plural steel plates in the radial direction.

A securing member 213 secures each rotor-core tooth portion 211 and each protrusion 212. Practically, on the outer end of each rotor-core tooth portion 211, there is formed a groove 211a allowing engagement of one end of the securing member 213. On the outer end of each protrusion 212, a groove 212a allowing engagement of the other end of the securing member 213 is formed as well.

Both grooves 211a and 212a are formed to extend in the axial direction of the rotor 20. Both ends of each securing member 213 are inserted into the grooves 211a and 212a through one end thereof, with the inserted portions secured thereat. This insertion makes it possible to improve assembling work of each securing member 213 with each rotor-core tooth portion 211 and the rotor core 121.

The groove 212a of each protrusion 212 serves as a securing portion.

The securing member 213 also extends in the circumferential direction to cover the outer side of each coil segment of the rotor coil 122. Each coil segment of the rotor coil 122 is located, below the securing member 213, between each rotor-core tooth portion 211 and each protrusion 212 on the rotor core 121. Thus, the securing member 213 is able to prevent each coil segment of the rotor coil 122 from coming off therefrom radially outward, due to the centrifugal force.

The securing member 213 is made of nonmagnetic materials. Thus magnetic flux passing each rotor-core tooth portion 211 and the stator core 111 is prevented from being leaked from the securing member 213, improving the performance of the generator motor.

Each protrusion 212 has a root portion, in which there is formed a refrigerant passage 212b formed to extend in the axial direction of the rotor 120. Making the refrigerant passage 212b circulate through the refrigerant passage 212b cools down the rotor coil 122 which is heated up due to the current supply. Though the two coil segments of the rotor coil 122 are arranged to pile up on one the other in the radial direction, i.e., the two coil segments are located on both sides of each protrusion 212 in its radial direction, the rotor coil 122 can be cooled down efficiently.

Figure 39A:
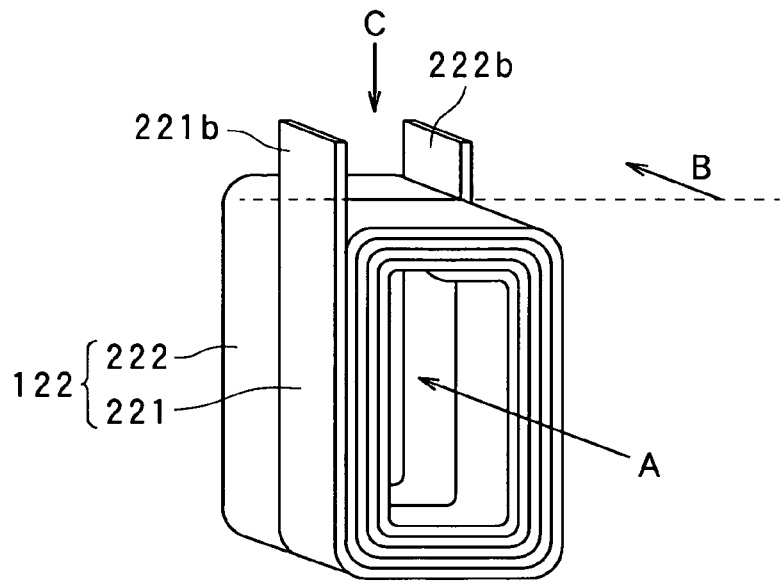
FIG. 39A is a perspective view showing coil segments of a rotor coil.

FIG. 39A is an oblique view showing a pair of coil segments of the rotor coil 122. The rotor coil 122 is made from "α-shaped form" windings, which will be detailed.

Each pair of coil segments of the rotor coil 122 consists of an inner coil segment 221 (a first coil segment) and an outer coil segment 222 (a second coil segment), both of which are wound by the coil.

Each of the coil segments 221 and 222 are piled up on one the other in a coil-axis direction "A" (refer to FIG. 39A), which corresponds to the radial direction of the rotor core 121. Hence when the rotor coil is assembled with the rotor-core tooth portions 211, the rotor coil 122 is simply placed around the portions 211 along the piling-up direction "A", facilitating the assembling work.

Figure 39B:
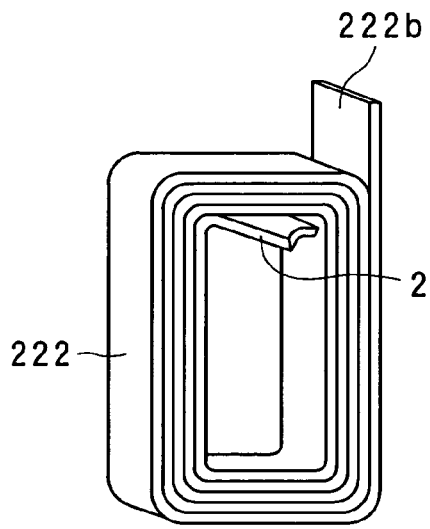
FIG. 39B is a perspective view showing a coil segment of the rotor coil taken along a "B" line in FIG. 39A.
Figure 39C:
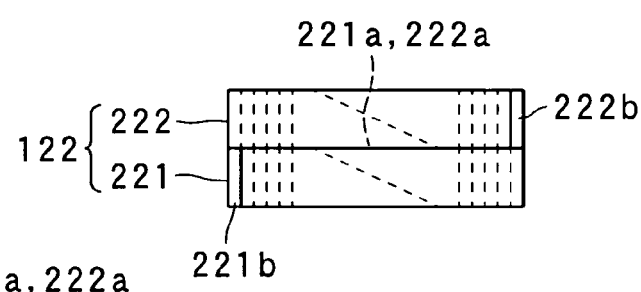
FIG. 39C is a plane view showing the coil segments of the rotor coil taken along a "C" line in FIG. 39A.

FIG. 39B shows the outer coil segment 222, which is viewed along an oblique line B in FIG. 39A. FIG. 39C also shows the inner and outer coil segments 221 and 222, which are viewed along a line C in FIG. 39A. As understood from the figures, the inner coil segment 221 has an inner-circumferential-side end 221a and an outer-circumferential-side end 221b and the outer coil segment 222 also has an inner-circumferential-side end 221b and an outer-circumferential-side end 222b. The inner-circumferential-side end 221a of the inner coil segment 221 is continuously bridged to the inner-circumferential-side end 222a of the outer coil segment 222. Both the outer-circumferential-side ends 221b and 222b of the inner and outer coil segments 221 and 222 are drawn outward from the coil segments 221 and 222 to form leads electrically connected to external wirings or others. Thus both the coil segments 221 and 222 are wounded in a "α-shaped form" as a whole when viewed along the coil-axis line "A".

This "α-shaped form" winding structure enables both the outer-circumferential-side ends 222b and 221b to be drawn out from both coil segments 221 and 222 in the same direction (in the upward direction in the figures). Both ends 222b and 221b can serve as a winding start and a winding end, respectively. Hence the electric connections between the coil segments 221 and 222 and the external wirings can be facilitated, because both one ends 221a and 222a of the coil segments 221 and 222 are connected from the beginning and the other ends 222b and 221b oriented in the same direction can be used. In this "α-shaped form" winding structure, a flat square wire can be used as the coil segments 221 and 222, providing a high lamination factor for the windings, which leads to an increase in the performance of the generator motor 10B.

As stated, in the third embodiment, the generator motor 10B is provided with the securing member 213 on both each rotor-core tooth portion 211 and the rotor core 21. The securing members 213 stop the coil segments 211 and 222 of the rotor coil 122 from shifting radially outward and coming off from the rotor 120 due to the centrifugal force generated when the rotor 120 rotates. Thus the rotor coil 122 is prevented from being removed from the rotor 120 under operation thereof.

For assembling the rotor coil 122 with the rotor 120, each pair of coil segments of the rotor coil 122 previously wound in a coil form is prepared, and the paired coil-shaped coil segments are fit around each rotor-core tooth portion 211. Thus the assembling work can be simplified, increasing the efficiency of the work.

This assembling structure allows the rotor-core tooth portions 211 to be integrated with the rotor core 121 from the beginning. Hence there are no gaps between the rotor-core tooth portions 211 and the rotor core 121, avoiding the magnetic resistance due to such gaps, thus avoiding the performance of the generator motor 10B owing to a decrease in the magnetic flux.

Figure 40A:
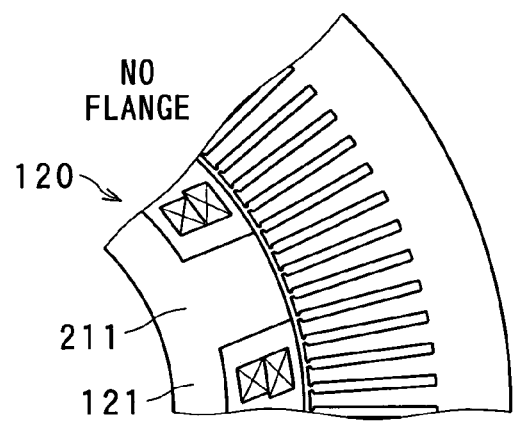
FIGS. 40A-40C are pictorially shown partial sectional views of generator motors used for comparative tests for confirming an advantageous output operation of the generator motor according to the third embodiment.
Figure 40B:
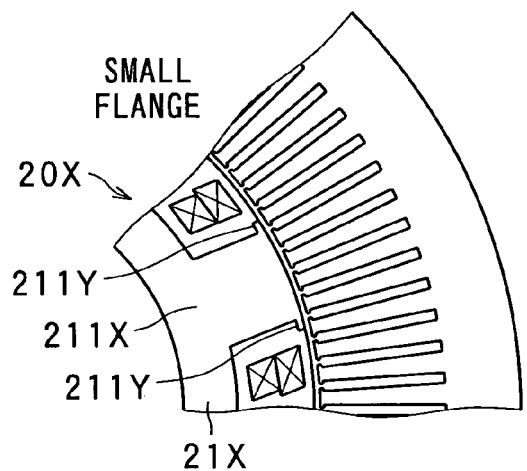
Figure 40C:
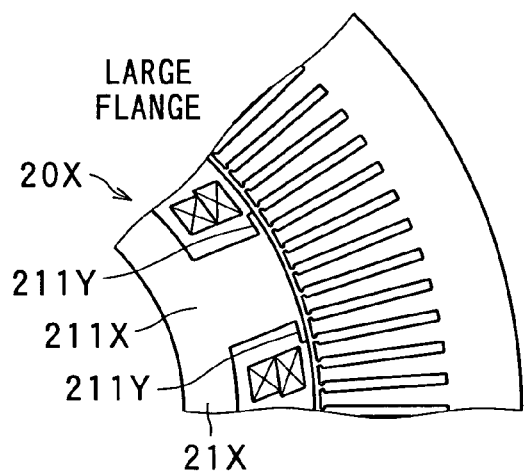
Figure 46:
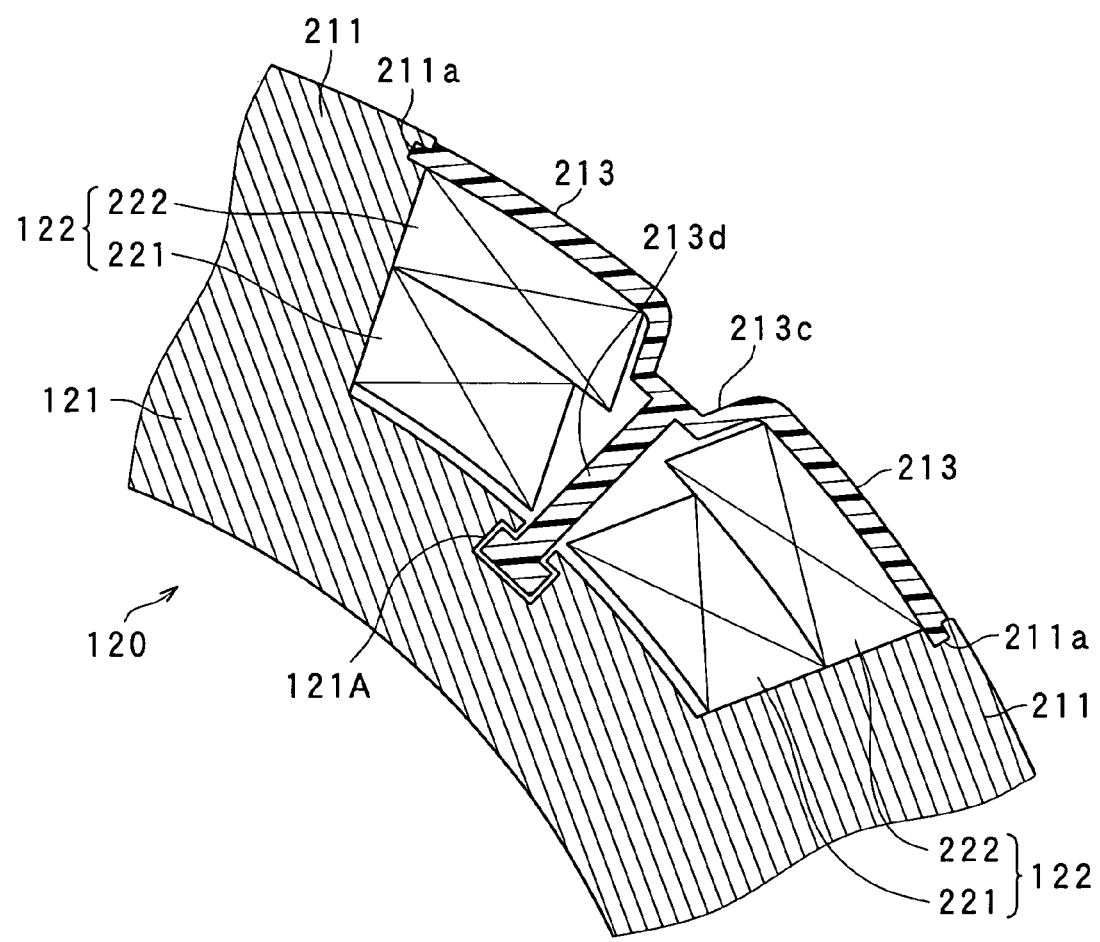
FIG. 46 is a partial sectional view showing a generator motor according to a modification of the structure shown FIG. 42.
Figure 47A:
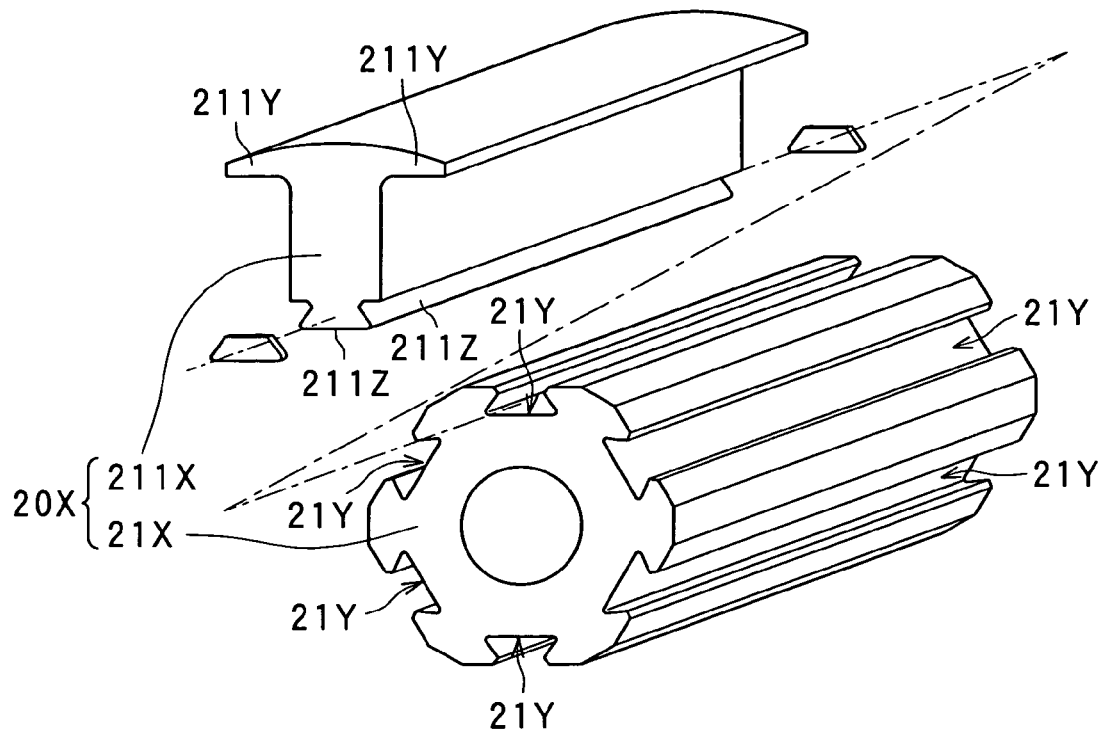
FIG. 47A is a perspective view explaining part of a rotor of a conventional generator motor.
Figure 47B:
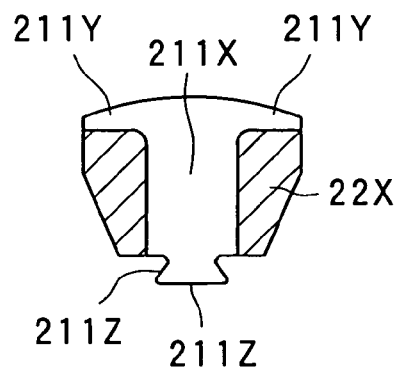
FIG. 47B is a side view explaining a protrusion equipped on the rotor of the conventional generator motor.

In the third embodiment, the rotor-core tooth portions 211, which act as magnetic salient poles, have no flange portions 211Y according to the conventional structure, shown in FIG. 46. Hence the inventors confirmed that how such a structural difference between the present embodiment and the conventional one will cause a difference in the magnetic flux, thus causing a difference in the performance of the generator motor. For this confirmation, comparative tests were performed as to three types of generator motors: a first generator motor with no flange portion, as shown in FIG. 40A; a second generator motor with smaller flange portions 211Y, as shown in FIG. 40B; and a third generator motor with lager flange portions 211Y, which are larger that in FIG. 40B, as shown in FIG. 40C.

Figure 41:
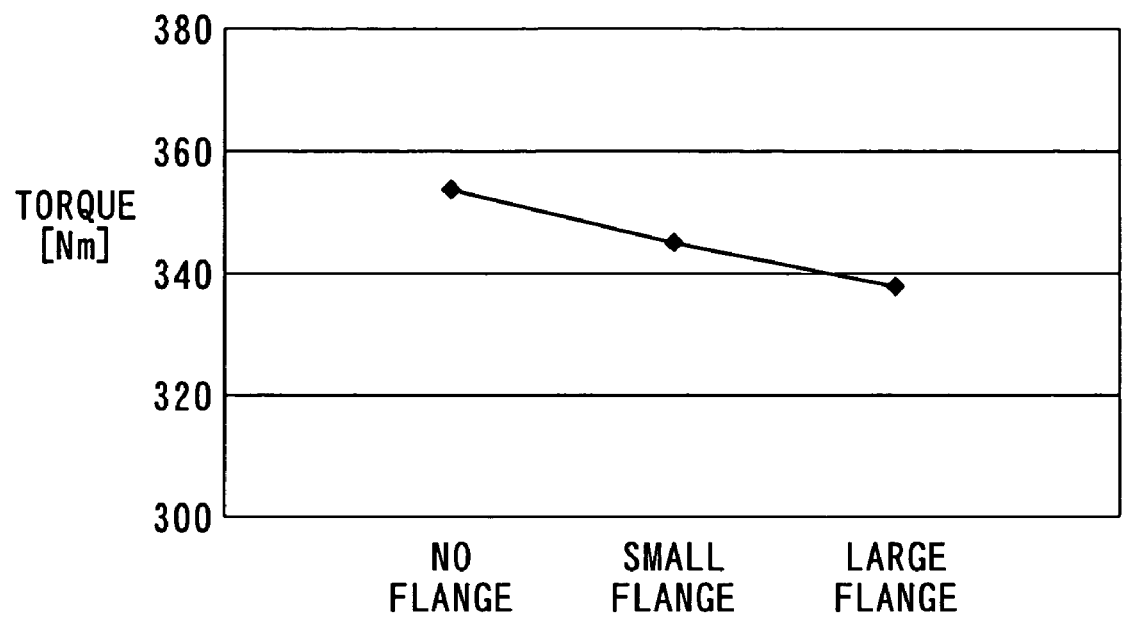
FIG. 41 is a graph showing results of the tests for the generator motors shown in FIGS. 40A-40C.

The test results are shown in FIG. 41. The tests show that the first generator motor with no flange portion outputs the highest torque and the output torque decreases as the flange portions 211Y become larger.

In the third embodiment, the flange portions which had conventionally been equipped at the magnetic salient poles 211 can be abolished, whereby the output of the generator motor can be increased.

Fourth Embodiment

Figure 39D:
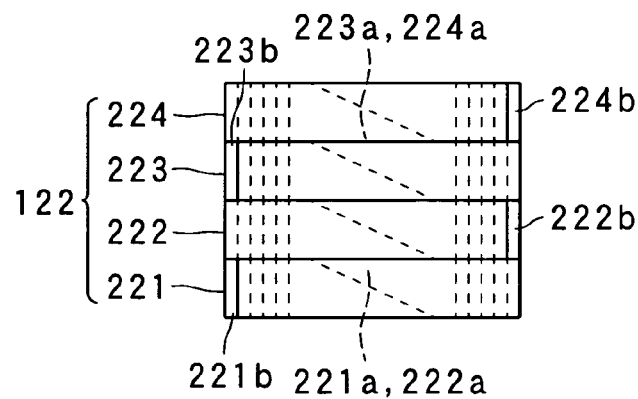
FIG. 39D is a plan view showing coil segments of the rotor coil which are according to a fourth embodiment of the present invention.

Referring now to FIG. 39D, a generator motor according to a fourth embodiment of the present invention will be described.

In the third embodiment, the "α-shaped form" winding structure is made up of a pair of inner and outer coil segments 221 and 222, which are included in the rotor coil 122. That is, the two coil segments 221 and 222 are laminated into two layers. In contrast, the forth embodiment adopts four layers of coil segments by adding third and forth coil segments 223 and 224. This four-layer coil segments 221-224 are mutually connected so that those segments still fall into the "α-shaped form" winding structure.

Practically, the added two coil segments 223 and 224 also have coil ends in the same way as those of the coil segments 221 and 222. The inner-circumferential-side end 221a of the inner coil segment 221 is continuously bridged to the inner-circumferential-side end 222a of the outer coil segment 222, and, at the same time, the inner-circumferential-side end 223a of the third coil segment 223 is continuously bridged to the inner-circumferential-side end 224a of the fourth coil segment 224. In addition, the outer-circumferential-side end 222b of the outer coil segment 222 is continuously connected to the outer-circumferential-side end 223b of the third coil segment 223. The outer-circumferential-side end 221b of the inner coil segment 221 and the outer-circumferential-side end 224b of the fourth coil segment 224 are drawn out as two leads electrically connected to external windings or others.

Fifth Embodiment

Figure 42:
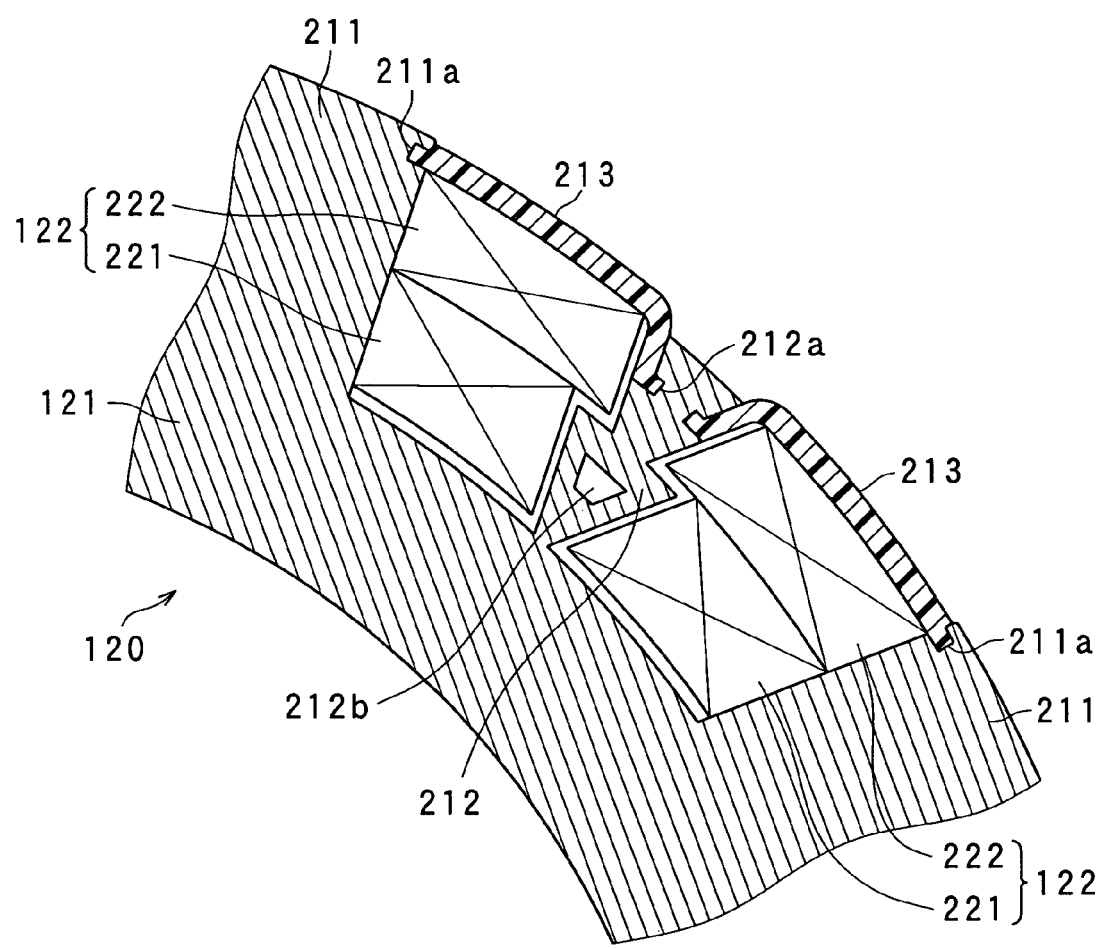
FIG. 42 is a partial sectional view showing a generator motor according to a fifth embodiment of the present invention.

Referring now to FIG. 42, a generator motor according to a fifth embodiment of the present invention will be described.

The present embodiment relates to the number of windings of the coil segments. In the third embodiment, the inner and outer coil segments 221 and 222 are the same in the number of windings. In the fourth embodiment, however, by way of example, the number of windings of the outer coil segment 222 is set to be greater than that of the inner coil segment 221. Hence the outer coil segment 222 is larger in the size in the circumferential direction than the inner coil segment 221.

There is a dead space between the mutually adjacent coil segment pairs 221, 222 and 221, 222. This dead space in the circumferential direction becomes larger as advancing radially outward. In consideration of this dead space, the circumferential size of the outer coil segment 222, which is positioned at a radially outward area in which the dead space is larger in the circumferential direction, is made larger to fit to the size of the dead space. The dead space can be utilized well, making the generator motor compact.

An alternative example concerning the four-layer coil segments 221-224 adopted in the fourth embodiment is that the number of windings of each of those coil segments 221-224 is made to differ from the remaining ones so as to conform the entire contour of those coil segments to the shape of the dead space along a plane perpendicular to the axial direction. In this structure, the dead space can be utilized more effectively. Alternatively each of the coil segments 221-224 may be made different from the others in terms of their coil material themselves, utilizing the dead space effectively.

Sixth Embodiment

Figure 43:
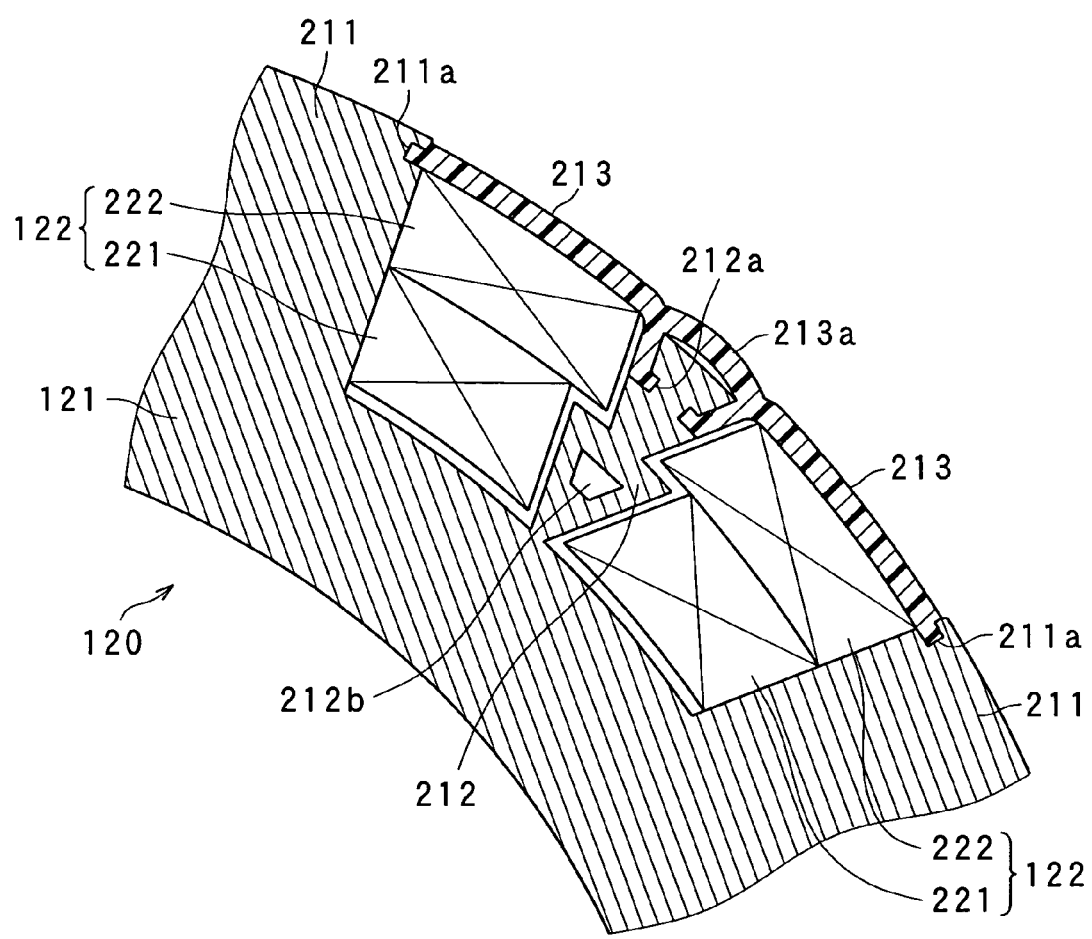
FIG. 43 is a partial sectional view showing a generator motor according to a sixth embodiment of the present invention.

Referring now to FIG. 43, a generator motor according to a sixth embodiment of the present invention will be described.

In the first to fifth embodiment, the plurality of securing members 213 are produced as different members. But this is not a definitive list. In the sixth embodiment, of the plural securing members 213, two securing members 213 arranged between mutually adjacent rotor-core tooth portions 211 are linked with each other by using a connector 213a so as to form an integrated single member made of nonmagnetic material such as resin. The connector 213a is located on the radial outer surface of each protrusion 212 and formed to extend in the circumferential direction.

Accordingly, the connector 213a strengthens the rigidity of the mutually adjacent two securing members 213. It is possible to give a higher securing force to the securing members 213 against coming off the rotor coil 122. The securing members 213 may be thickened.

Seventh Embodiment

Figure 44:
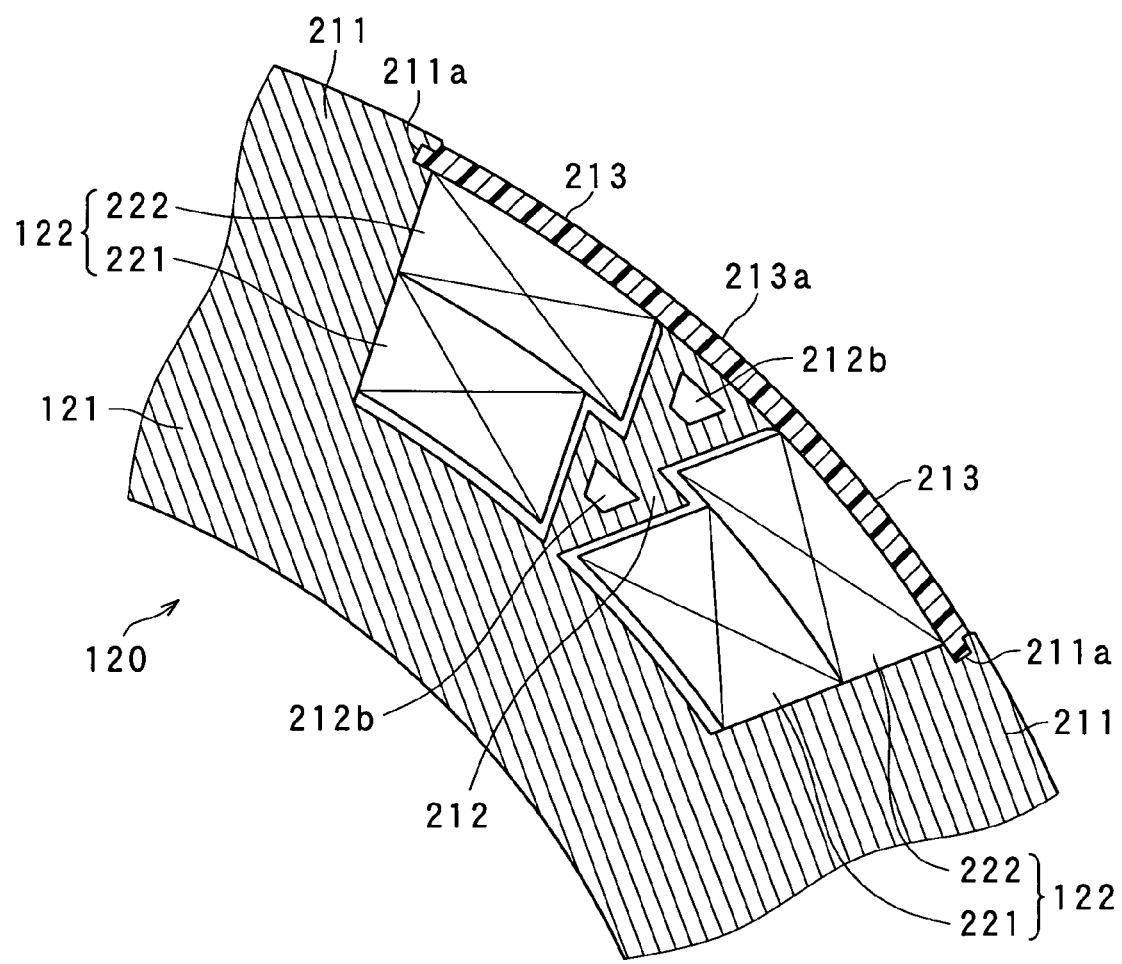
FIG. 44 is a partial sectional view showing a generator motor according to a seventh embodiment of the present invention.

Referring now to FIG. 44, a generator motor according to a seventh embodiment of the present invention will be described.

As shown in FIG. 44, like the sixth embodiment, mutually adjacent two securing members 213 are linked to each other by a connector 213b to form a single flat, but curved member. This single member has both ends engaged with the grooves 211a of both the rotor-core tooth portions 211, respectively. In addition, this single member is arranged with no engagement with the protrusion 212, unlike the sixth embodiment.

Thus, the single securing member simplifies the shape of the securing members 213 and the protrusion 212.

In the sixth embodiment, the refrigerant passage 212b is located to face only the inner coil segment 221. However, this can be modified a further way, where there is formed an additional refrigerant passage 212b to face the outer coil segment 222. This additional formation of the refrigerant passage 212b can be done, because the grooves are eliminated from the protrusion 212.

Eighth Embodiment

Figure 45A:
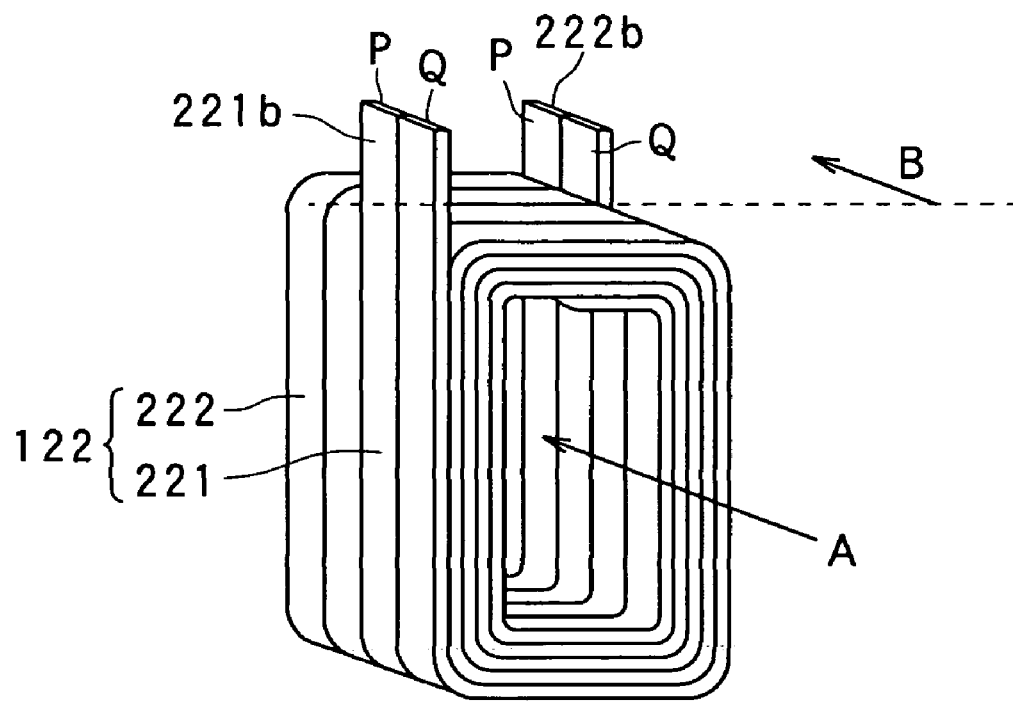
FIG. 45A is a perspective view showing coil segments of the rotor coil which are according to an eighth embodiment of the present invention.
Figure 45B:
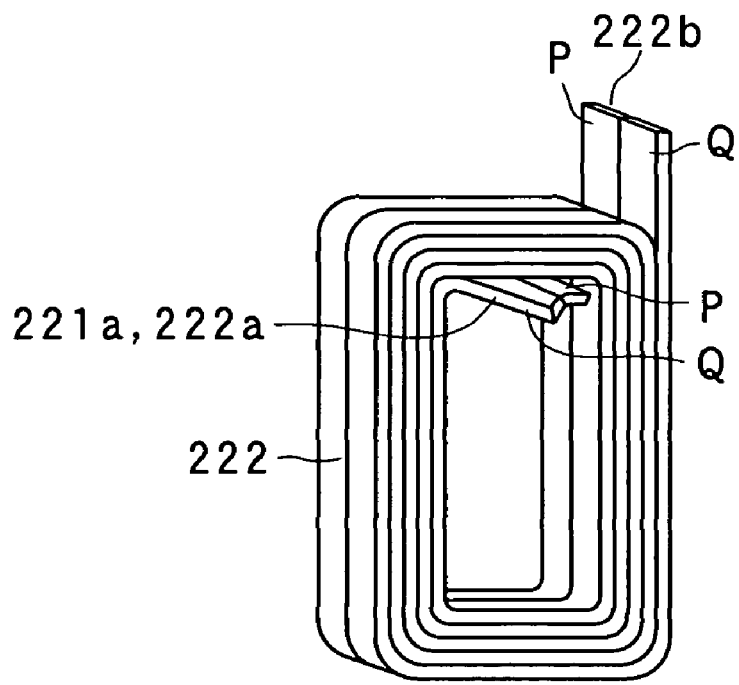
FIG. 45B is a perspective view showing a coil segment taken along a "B" line in FIG. 45A.

Referring now to FIGS. 45A and 45B, a generator motor according to an eighth embodiment of the present invention will be described.

In the foregoing third to seventh embodiments, each coil segment of the rotor coil 122 is formed using a single winding, but this is not a definitive example. In the eighth embodiment, each of the inner and outer coil segments 221 and 222 is formed by winding two winding wires P and Q. The two winding wires P and Q are wound to be contiguous with each other (side by side). From a different viewpoint, the winding structure in FIGS. 45A and 45B can be said that each of the inner and outer coil segments 121 and 122 is divided into two coil wires P and Q along its wound direction. FIG. 45B is a view taken along a "B" line in FIG. 45A.

Modifications

In the foregoing third to eighth embodiments, the rotor core 121 and rotor-core tooth portions 211 are produced by limiting a plurality of steel plates on one another in their thickness direction. This lamination structure may not always be adopted, and may be replaced by a single member having a predetermined cubic body.

In another modification, the securing portions, which are served by the grooves 212a on each protrusion 212, can be eliminated. Instead, such grooves can be formed directly on the outer circumferential surface of the rotor core 21.

By the way, forming the securing portions (grooves 212a) on both ends of each protrusion 212 makes it possible to shorten the length of radially extended parts of the securing member 213. Hence, for withstanding the centrifugal force applied to the rotor coil 122, a stress caused in the securing member 213 can be made smaller. In addition, each protrusion 212 is allowed to be located at a dead space between mutually adjacent coil segments, which leads to be effective unitization of the dead space, making the generator motor compact.

With regard to supporting the securing members 213, another modification can be provided as shown in FIG. 46. In the supporting structure shown in FIG. 46, the foregoing protrusion 212 is removed and a groove (or recess) 121A is formed in the rotor core 121 instead. The two securing members 213 fixedly covering the two mutually adjacent rotor coils 122 respectively are formed as an integrated member curved to have a recess 213c at its central part in the circumferential direction in the assembled attitude shown in FIG. 46. The recess 213c is effective for steadily pressing the rotor coils 122. The integrated securing members 213 have a connecting rod 213d (serving as a connecting member) extending from the central part, which connecting rod 213d is integrated with the securing members and is made of a nonmagnetic material, like the securing members 213. Thus when the integrated securing members 213 are assembled with the motor, the other end of the connecting rod 213d engages with the groove 121A, providing supporting the securing members 213, thus securing the rotor coils 122. Alternatively, the connecting rod 213d may be a separate member, provided the member is able to fixedly connect the groove 121A and the securing members 213. Hence the combination of the groove 121A and connecting rod 213d provides the advantages identical or similar to the foregoing ones as well as an advantage that it is easier that the conventional rotor structure employ the combination in this modification.

Furthermore, the rotor structure shown in FIG. 22 can also be applied to those of the third to eighth embodiments and their modifications. That is, as explained with FIG. 22, the magnet 26a can be embedded in each of the rotor-core tooth portions 26. The magnets 26a assist excitation of the rotor 20.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A rotary electric apparatus comprising:
    a synchronous machine having a stator with multiphase armature windings wound therein and a rotor with a field winding wound therein and rotatable around the stator;
    an inverter that produces armature currents as AC (alternating current) power from DC (direct current) power and supplies the armature currents to the armature windings;
    a DC power supply that outputs first voltage of a first voltage value and second voltage of a second voltage value higher than the first voltage value, the first and second voltages being the DC power;
    a current flow regulator that regulates directions of currents induced through the field winding by the rotor exciting currents into one way, the current flow regulator being electrically connected to the field winding; and a controller that controls the inverter such that the inverter produces the armature currents consisting of synchronized currents producing rotating fields depending on a rotating position of the rotor and rotor exciting currents different in waveforms from the synchronized currents and superposed on the synchronized currents, at least the rotor exciting currents being powered by the second voltage.

2. The rotary electric apparatus of claim 1, wherein the DC power supply comprises a first power supply that outputs the first voltage and a second power supply that outputs the second voltage.

3. The rotary electric apparatus of claim 2, wherein the first power supply is a battery that outputs the first voltage and the second power supply is a booster that boosts up the first voltage up to the second voltage.

4. The rotary electric apparatus of claim 3, wherein the second power supply is adapted to always supply the second voltage to the inverter.

5. The rotary electric apparatus of claim 3, wherein the second power supply is adapted to supply the second voltage to the inverter only when the rotor exciting currents are superposed on the synchronized currents.

6. The rotary electric apparatus of claim 3, wherein the first voltage value is a rated voltage value of the battery.

7. The rotary electric apparatus of claim 6, further comprising an electrical switch that switches an electrical connection between the DC power supply and the inverter into either an electrical path from the first power supply to the inverter or a further electrical path from the second power supply to the inverter.

8. The rotary electric apparatus of claim 7, further comprising a switch controller that controls the switch such that the second power supply that outputs the second voltage to the inverter when the rotor exciting currents are superposed.

9. The rotary electric apparatus of claim 2, wherein the first power supply is a first battery that outputs the first voltage as a rated voltage value thereof and the second power supply is a second battery that outputs the second voltage as a rated voltage value thereof.

10. The rotary electric apparatus of claim 9, further comprising an electrical switch that switches an electrical connection between the DC power supply and the inverter into either an electrical path from the first power supply to the inverter or a further electrical path from the second power supply to the inverter.

11. The rotary electric apparatus of claim 9, further comprising a switch controller that controls the switch such that the second power supply that outputs the second voltage to the inverter when the rotor exciting currents are superposed.

12. The rotary electric apparatus of claim 1, wherein the controller is adapted to control the inverter such that the rotor exciting currents are superposed on the synchronized currents during a predetermined period of time shorter a cycle of each of the synchronized currents.

13. The rotary electric apparatus of claim 1, wherein the stator has a face facing the rotor, the face comprising a plurality of salient poles, and
the controller is adapted to control the inverter such that the rotor exciting currents are superposed on the synchronized currents during a predetermined period of time shorter a period of time during which a one point of the rotor passes by mutually adjacent salient poles among the salient poles.

14. The rotary electric apparatus of claim 1, wherein the controller is adapted to control the inverter such that rotor exciting voltages that generates the rotor exciting currents that are set phase by phase are superposed on synchronized voltages that generate the synchronized currents.

15. The rotary electric apparatus of claim 14, wherein a voltage obtained by superposing each of the rotor exciting voltages on each of the synchronized voltages is the second voltage value.

16. The rotary electric apparatus of claim 15, wherein each of the rotor exciting voltages is made from either a pulsed voltage or a PWM (pulse width modulation) voltage and each of the synchronized voltages is a PWM voltage on which each rotor exciting voltage is superposed.

17. The rotary electric apparatus of claim 16, wherein each of the rotor exciting voltages is superposed on each of the synchronized voltage in the vicinity of a zero-crossing point of each synchronized voltage.

18. The rotary electric apparatus of claim 14, wherein each of the rotor exciting voltages is made from either a pulsed voltage or a PWM (pulse width modulation) voltage and each of the synchronized voltages is a PWM voltage on which each rotor exciting voltage is superposed.

19. The rotary electric apparatus of claim 18, wherein each of the rotor exciting voltages is superposed on each of the synchronized voltage in the vicinity of a zero-crossing point of each synchronized voltage.

* * * * *